(12) United States Patent
Katoh et al.

(10) Patent No.: US 7,110,008 B2
(45) Date of Patent: Sep. 19, 2006

(54) DISPLAY DEVICE HAVING AN IMAGE SHIFTER

(75) Inventors: Hiromi Katoh, Nara (JP); Koichi Miyachi, Soraku-gun (JP); Akihito Jinda, Kitakatsuragi-gun (JP); Hiroshi Hamada, Nara (JP); Takashi Shibatani, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 10/084,109

(22) Filed: Feb. 27, 2002

(65) Prior Publication Data

US 2003/0058228 A1 Mar. 27, 2003

(30) Foreign Application Priority Data

Mar. 2, 2001 (JP) ............................. 2001-059154
Jan. 9, 2002 (JP) ............................. 2002-002440

(51) Int. Cl.
*G09G 5/10* (2006.01)
*G09G 3/28* (2006.01)

(52) U.S. Cl. ........................... 345/690; 345/88; 345/89
(58) Field of Classification Search ............ 345/87–89, 345/690, 581, 691, 698, 204; 348/762, 767
See application file for complete search history.

(56) References Cited

U.S. PATENT DOCUMENTS 5,640,173 A * 6/1997 Prince et al. ................. 345/58
5,956,006 A * 9/1999 Sato ............................. 345/88
6,061,103 A 5/2000 Okamura et al. ............ 348/767
6,219,017 B1 * 4/2001 Shimada et al. .............. 345/88
6,384,816 B1 * 5/2002 Tabata ......................... 345/204
6,700,559 B1 * 3/2004 Tanaka et al. ................. 345/88

FOREIGN PATENT DOCUMENTS

| EP | 1 001 306 A2 | 5/2000 |
|----|--------------|--------|
| JP | 07-036054 | 2/1995 |
| JP | 07-121138 | 5/1995 |
| JP | 2000-023067 | 1/2000 |
| JP | 2001-051231 | 2/2001 |
| JP | 2001-091894 | 4/2001 |

* cited by examiner

*Primary Examiner*—Amr A. Awad
(74) *Attorney, Agent, or Firm*—David G. Conlin; David A. Tucker; Edwards Angell Palmer & Dodge LLP

(57) ABSTRACT

A display device divides each frame into a number of subframes and displays one of the subframes after another. The device includes a correction circuit for correcting a subframe signal representing one subframe by reference to another subframe signal representing another subframe. Each said subframe is displayed in accordance with the subframe signal that has been corrected by the correction circuit.

41 Claims, 22 Drawing Sheets

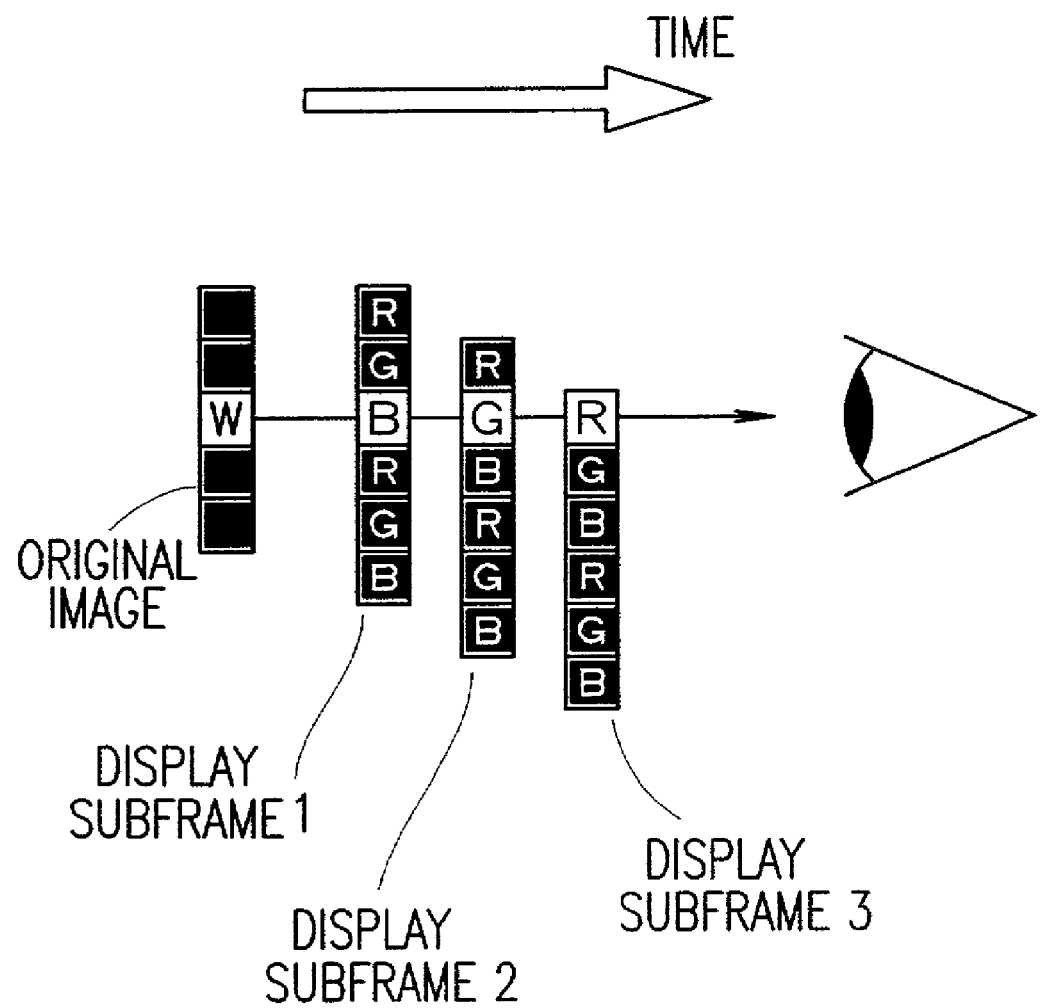

DISPLAY DEVICE HAVING AN IMAGE SHIFTER

BACKGROUND OF THE INVENTION

1. Field of the Invention

The present invention relates to a device for forming an image by dividing one frame into multiple subframes and sequentially displaying one of these subframes after another.

2. Description of the Related Art

To increase the resolution of a displayed image without increasing the actual number of pixels on a display device, a display device for displaying wobbled fields when conducting an interlaced display operation is currently under research and development. According to a display device of this type, an even-numbered field and an odd-numbered field are alternately displayed on the same display panel, and one of these two types of fields is slightly shifted with respect to the other. This shifting is carried out by some means for oscillating an optical axis, which will be herein referred to as an "image shifter". As a result, the resolution of an image formed by such a display device can be substantially equal to that of an image formed by a display device that has twice as great a number of scan lines (or pixels) as the actual number of scan lines (or pixels) of the former display device.

A display device of this type needs to modulate incoming light for each pixel at twice as high a rate as the usual frame rate. However, if such light modulation should be carried out by a liquid crystal layer of the display panel, then the resolution of the displayed image decreases in the end because the response of the liquid crystal is usually low.

To solve this problem, each of the display devices disclosed in Japanese Laid-Open Publication Nos. 11-271710, 2000-147489 and 2000-23067 corrects the level of a subframe signal representing a current field to be displayed by reference to that of a subframe signal representing the previous field, thereby attempting to increase the response speed of the liquid crystal material.

Such a low response speed of the liquid crystal is also a problem even in a field sequential color display method for use to form a color image. In a field sequential color display method, each frame representing a color image is divided into three fields corresponding to the three primary colors of red (R), green (G) and blue (B), respectively, and these fields are sequentially displayed one after another. In this case, the light emitted from a light source has its colors changed synchronously with the display of these fields for the respective colors, thereby producing a color image on a projection plane. Even in a display device that utilizes this field sequential color display method, the delay in response of the liquid crystal material causes the mixture of fields for the respective colors and decreases the color reproducibility disadvantageously.

Japanese Laid-Open Publication No. 7-121138 discloses a method for increasing the response speed of a liquid crystal material by correcting the level of a subframe signal representing a current field to be displayed by reference to that of a subframe signal representing the previous field in forming a color image by the field sequential color display method.

In each of these two types of conventional techniques, a picture frame is formed by dividing one frame into a number of fields and sequentially displaying those fields one after another. Also, to increase the response speed of the liquid crystal material when one of those fields is refreshed by another, a subframe signal representing a current field is corrected by reference to a subframe signal representing the previous field.

For example, suppose one frame is divided into first, second and third subframes so that one of these subframes is displayed after another. It should also be noted that the "subframe" is herein a broad term including the "field" as used in interlaced scanning. In this case, a subframe signal representing the second subframe is corrected by reference to a subframe signal representing the first subframe. In the same way, a subframe signal representing the third subframe is corrected by reference to the subframe signal representing the second subframe. That is to say, a corrected subframe signal is generated for each of the second and third subframes by reference to a subframe signal representing its previous subframe (or field) that belongs to the same frame.

According to the techniques disclosed in the four aforementioned publications, a subframe signal representing the first subframe of a current frame needs to be corrected by using a subframe signal representing the third subframe (i.e., the last subframe) of the previous frame. However, when the first subframe of the current frame should be displayed, the subframe signal representing the last subframe of the previous frame has already been erased by the subframe signal representing the first subframe of the current frame. This is because the latter subframe signal is overwritten on the former subframe signal. That is to say, in the prior art described in the aforementioned publications, no correction can be made on the subframe signal representing the first subframe of each frame. As a result, the correction cannot be so effective and the image quality degrades disadvantageously.

SUMMARY OF THE INVENTION

In order to overcome the problems described above, a primary object of the present invention is to provide a display device that can correct a subframe signal representing each and every subframe, including the first one, appropriately enough and that can change the subframes at a sufficiently high frequency even when the response speed of the light modulating medium used is relatively low.

Another object of the present invention is to provide a display device that needs a reduced number of memories or a smaller storage capacity for storage of the subframe signals representing respective subframes.

Still another object of the present invention is to provide a display device that can make an appropriate correction on a subframe signal.

A display device according to the present invention divides each frame into a number of subframes and displaying one of the subframes after another. The device comprises: correction means for correcting a subframe signal representing one subframe by reference to another subframe signal representing another subframe, and a display panel for displaying each said subframe in accordance with the subframe signal that has been corrected by the correction means.

In one preferred embodiment of the present invention, the correction means corrects a subframe signal, representing the first one of the subframes that make up a current frame, by reference to a subframe signal representing the last one of the subframes that make up the previous frame. On the other hand, the correction means corrects a subframe signal, representing a non-first one of the subframes of the current frame, by reference to a subframe signal representing the previous one of the subframes of the current frame that has been displayed just before the non-first subframe.

In an alternative preferred embodiment of the present invention, the correction means corrects a subframe signal, representing the first one of the subframes that make up a current frame, by reference to a subframe signal representing another one of the subframes of the current frame, the another subframe being equivalent to the last subframe of the previous frame. On the other hand, the correction means corrects a subframe signal, representing a non-first one of the subframes of the current frame, by reference to a subframe signal representing the previous one of the subframes of the current frame that has been displayed just before the non-first subframe.

In another alternative preferred embodiment, before a first one of the subframes that make up each said frame is displayed, a bypass subframe may be displayed. The bypass subframe is preferably prepared for second and third ones of the subframes. The second subframe has preferably been displayed just before the first subframe, while the third subframe is preferably to be displayed next to the first subframe.

In still another preferred embodiment, the display device may further include an image shifter for shifting the subframes on a projection plane. In that case, a pixel area on the projection plane, which corresponds to one of the pixel regions of the display panel, may be sequentially irradiated with multiple light rays that have been modulated at mutually different pixel regions and that belong to respectively different wavelength ranges.

In yet another preferred embodiment, the device may divide each said frame into a number of subframes so that the subframes correspond to three mutually different wavelength ranges and may display the subframes on a projection plane by a time-sharing technique, thereby forming a color image on the projection plane.

In yet another preferred embodiment, the device may sequentially scan a spatial light modulator with multiple light rays belonging to mutually different wavelength ranges, thereby superimposing the subframes one upon another on a projection plane and irradiating a single area on the projection plane with the light rays that belong to the mutually different wavelength ranges and that have been modulated at the same pixel region.

In yet another preferred embodiment, the display device may further include a memory for storing the subframe signal representing the last subframe of the previous frame at least until the first subframe of the current frame has been displayed.

In an alternative preferred embodiment, the display device may further include a memory for storing the subframe signal representing the last subframe of the previous frame at least until the first subframe of the current frame has been stored.

In yet another preferred embodiment, the display device may further include storage means for storing subframe signals representing a plurality of frames thereon. In that case, each said subframe signal is written on, or read out from, the storage means preferably on a frame-by-frame basis.

In an alternative preferred embodiment, the display device may further include storage means for storing subframe signals representing a plurality of subframes thereon. In that case, the storage means preferably includes a plurality of memory areas that have been partitioned for the respective subframes.

In yet another preferred embodiment, at least one additional voltage level, which is higher than the highest one of multiple voltage levels prepared to output a subframe signal yet to be corrected, may be provided and used as a voltage level at which the corrected subframe signal is output.

In an alternative preferred embodiment, at least one additional voltage level, which is lower than the lowest one of multiple voltage levels prepared to output a subframe signal yet to be corrected, may be provided and used as a voltage level at which the corrected subframe signal is output.

In yet another preferred embodiment, the correction means may consult a lookup table for subframe signals representing the previous and current subframes, respectively, to correct the subframe signal representing the current subframe in accordance with the lookup table.

In this particular preferred embodiment, the display device may further include: a nonvolatile memory on which data required for correcting the subframe signals has been stored; means for reading out the data from the nonvolatile memory; and a second memory on which the data that has been read out from the nonvolatile memory is storable. When the device starts to be driven, the data is preferably transferred from the nonvolatile memory to the second memory to make the lookup table.

In yet another preferred embodiment, the correction means may correct the subframe signal representing the current subframe to be displayed by performing an arithmetic operation on the subframe signal representing the subframe to be referred to and the subframe signal representing the current subframe to be displayed.

In this particular preferred embodiment, the arithmetic operation may be given by $SA'_n = SA_n + (SA_n - SA_{n-1})/M$, where $SA'_n$ is the corrected subframe signal, $SA_n$ is the subframe signal representing the current subframe, $SA_{n-1}$ is the subframe signal representing the subframe to be referred to and M is a positive number.

In one specific preferred embodiment, M may be $2^n$ (where n is an arbitrary integer).

Optionally, the magnitude of M may be changed in accordance with the magnitude of $(SA_n - SA_{n-1})$.

In yet another preferred embodiment, the subframe signal may be a signal of q bits (where q is an integer equal to or greater than 2), and high-order p bits of the q-bit signal (where p is an integer equal to or greater than 1 and q>p) may be corrected.

In yet another preferred embodiment, each said frame may be divided into a number m of subframes, where m is an integer equal to or greater than 3. In that case, n out of the m subframes (where n is an integer equal to or greater than 2 and n<m) are preferably displayed sequentially within one frame interval.

In one specific preferred embodiment, m may be 3 and n may be 2.

In yet another preferred embodiment, the device may conduct a display operation in accordance with a driving method for use to display the subframes and in response to the signal having the preset level.

In yet another preferred embodiment, the displayed subframe may be refreshed by supplying the signal having the preset level to all scan lines that make up the image.

In yet another preferred embodiment, the signal having the preset level may be corrected by using the subframe signal representing the subframe that has been displayed just before the current subframe.

In yet another preferred embodiment, a subframe signal, representing the subframe that is displayed just after the displayed subframe has been refreshed, may be corrected by using a refresh signal.

In yet another preferred embodiment, a black image may be formed by conducting the display operation in response to the signal having the preset level.

In yet another preferred embodiment, while the device is conducting a display operation in response to the signal having the preset level, no display pixels may be illuminated by a light source.

In yet another preferred embodiment, the bypass subframe may be displayed for a constant length of time.

In an alternative preferred embodiment, the bypass subframe may be displayed for a variable length of time, which changes with the subframes that are displayed before and after the bypass subframe.

In yet another preferred embodiment, a subframe signal representing the bypass subframe may be corrected by using the subframe signal representing the subframe that has been displayed just before the bypass subframe.

In yet another preferred embodiment, the subframe signal, representing the subframe to be displayed just after the bypass subframe, may be corrected by using the subframe signal representing the bypass subframe.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 illustrates how subframes are shifted.

FIGS. 8A and 8B illustrate how a number of subframes are synthesized with each other.

DETAILED DESCRIPTION OF PREFERRED EMBODIMENTS

Figure 1:
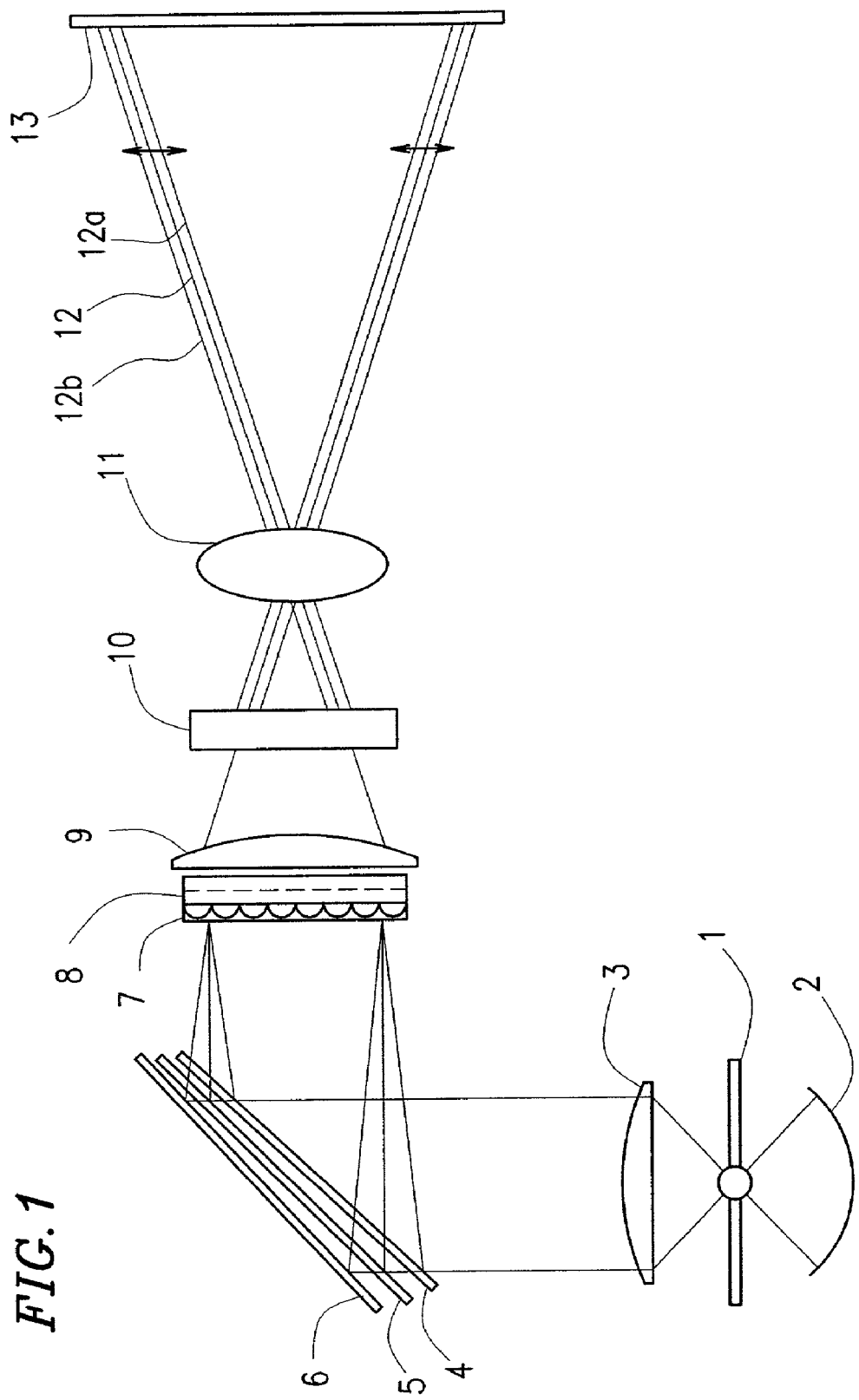
FIG. 1 is a schematic representation illustrating a projection type display device according to a preferred embodiment of the present invention.

Hereinafter, preferred embodiments of the present invention will be described with reference to the accompanying drawings.

EMBODIMENT 1

A first specific preferred embodiment of the present invention relates to a single-panel projection type display device (a single-panel video/data projector) including no color filters. This display device generates data representing a plurality of subframes from data representing each of the frames. The subframes are sequentially displayed on a display panel in the display device. Also, by sequentially shifting these subframes on a projection plane, the same area corresponding each pixel on the projection plane is sequentially irradiated with multiple light rays. In the embodiment of the invention, the multiple light rays have been modulated in mutually different pixel regions of the display panel and belong to respectively different wavelength ranges (which will be herein referred to as "R, G and B light rays"), thereby realizing a high-resolution full-color display.

For example, take a particular area on the projection plane or screen, which corresponds to one pixel of the display panel. In this preferred embodiment, the particular area may be irradiated with a red (R) light ray in an interval during which a subframe is being displayed (which interval will be herein referred to as a "subframe interval"). In that case, the particular area may be irradiated with a green (G) light ray in the next subframe interval and with a blue (B) light ray in the following subframe interval, respectively. In this manner, according to the present invention, the color of each pixel on the projection plane is defined by the time-sharing irradiation of the R, G and B light rays.

In this preferred embodiment, each subframe is formed by combining the R, G and B light rays with each other as will be described in detail later. That is to say, in a subframe interval, the projection plane is irradiated with the R, G and B light rays that have been modulated by the display panel. These modulated R, G and B light rays are directed toward mutually different positions on the projection plane in each subframe interval. Accordingly, those light rays are synthesized together with time, thereby displaying a full-color image frame on the projection plane.

According to various preferred embodiments of the present invention, such a time-sharing synthesis of the R, G and B light rays is performed by an image shifter. The image shifter is disposed between the display panel and the projection plane to change the optical path of the light ray, which has been modulated by the display panel, periodically and regularly.

The present invention relates to a projection type display device and will be described as being applied to a display device of this type as for this preferred embodiment. It should be noted, however, that the present invention is not limited to this particular type of display device but is effectively applicable to a direct view type display device such as viewer or head mount display.

Hereinafter, an exemplary arrangement of the display device according to the first preferred embodiment of the present invention will be described with reference to FIG. 1.

As shown in FIG. 1, the projection type display device of this preferred embodiment includes light source 1, liquid crystal display panel 8, light control section and projection optical system. The light control section is provided to converge the light emitted from the light source 1 onto associated pixel regions of the liquid crystal display panel 8 in accordance with the wavelength ranges thereof. The projection optical system is provided to project the light rays, which have been modulated by the liquid crystal display panel 8, onto the projection plane.

This projection type display device further includes spherical mirror 2, condenser lens 3 and three dichroic mirrors 4, 5 and 6. The spherical mirror 2 reflects the (white) light, which has been emitted backward from the light source 1, toward the condenser lens 3 disposed in front of the light source 1. The condenser lens 3 collimates the light, which has come from the light source 1 and the spherical mirror 2, into a parallel luminous flux. Then, the luminous flux is separated by the dichroic mirrors 4, 5 and 6 into a plurality of luminous fluxes according to the wavelength ranges thereof. The luminous fluxes that have been reflected by the dichroic mirrors 4, 5 and 6 are then incident onto a micro lens array 7 at mutually different angles corresponding to their wavelength ranges. The micro lens array 7 is secured to one of the two substrates of the liquid crystal display panel 8 that is located closer to the light source 1. The luminous fluxes, which have been incident onto the micro lens array 7 at their respective angles, will be focused on their associated pixel regions that are located at mutually different positions.

In this projection type display device, the projection optical system includes a field lens 9 and a projection lens 11 to project the luminous fluxes 12, which have been transmitted through the liquid crystal display panel 8, onto a screen (i.e., the projection plane) 13. In the preferred embodiment illustrated in FIG. 1, an image shifter 10 is disposed between the field lens 9 and the projection lens 11. FIG. 1 illustrates luminous fluxes 12a and 12b that have been shifted parallel to the projection plane by the image shifter 10. To shift these luminous fluxes 12a and 12b, however, the image shifter 10 may be disposed anywhere between the liquid crystal display panel 8 and the screen 13.

For example, the image shifter 10 may be disposed between the projection lens 11 and the screen 13.

Next, the respective members of this projection type display device will be described one by one.

In this preferred embodiment, a metal halide lamp having an optical output power of about 150 W, an arc length of about 5 mm and an arc diameter of about 2.2 mm is used as the light source 1 and is disposed such that the arc length direction thereof is parallel to the paper sheet. Examples of other usable light sources include halogen lamp, extra-high voltage mercury lamp and xenon lamp. The light source 1 used in this preferred embodiment emits white light including light rays falling within three wavelength ranges corresponding to the three primary colors.

The spherical mirror 2 is disposed behind the light source 1. The condenser lens 3, having an aperture of about 80 mm φ and focal length of about 60 mm, is disposed in front of the light source 1. The spherical mirror 2 is positioned so as to have its center aligned with the center of emission of the light source 1, while the condenser lens 3 is positioned so as to have its focal point aligned with the center of the light source 1.

In this arrangement, the light emitted from the light source 1 is collimated by the condenser lens 3 so that the liquid crystal display panel 8 is illuminated with the collimated luminous flux. The degree of parallelism of the light that has passed through the condenser lens 3 may be about 2.2 degrees in the arc length direction (i.e., a direction parallel to the paper sheet of FIG. 1) and about 1 degree in the arc diameter direction.

The liquid crystal display panel 8 used in this preferred embodiment is a transmission type liquid crystal display in which the micro lens array 7 is disposed on one of its two transparent substrates that is located closer to the light source 1. Any liquid crystal material may be used for the liquid crystal layer of the panel 8 and the panel 8 may operate in an arbitrarily selected mode so long as the panel 8 can operate at a sufficiently high speed. In this preferred embodiment, the panel 8 is operated in a twisted nematic (TN) mode. The liquid crystal display panel 8 includes a plurality of pixel regions for modulating the incoming light. As used herein, the "pixel regions" refer to respective light modulating portions of the display panel that are spatially separated from each other. In this liquid crystal display panel 8, a voltage is applied from a pixel electrode, associated with one of those pixel regions, to an associated portion of the liquid crystal layer, thereby changing the optical properties of that portion and modulating the incoming light passing through that portion.

This liquid crystal display panel 8 may include 768 pixels horizontally by 1,024 scan lines vertically, which may be driven by a noninterlaced scanning technique. The pixel regions of the liquid crystal display panel 8 are arranged two-dimensionally on one of its two transparent substrates. In this preferred embodiment, the pitch of the pixel regions may measure about 26 μm both horizontally and vertically. Also, in this preferred embodiment, the pixel regions associated with the R, G and B light rays are so arranged as to form a striped pattern in the horizontal direction of the screen (i.e., so that the stripes extend vertically), and each of the micro lenses included in the array 7 is associated with one of multiple sets of three pixel regions provided for the R, G and B light rays, respectively.

Figure 2:
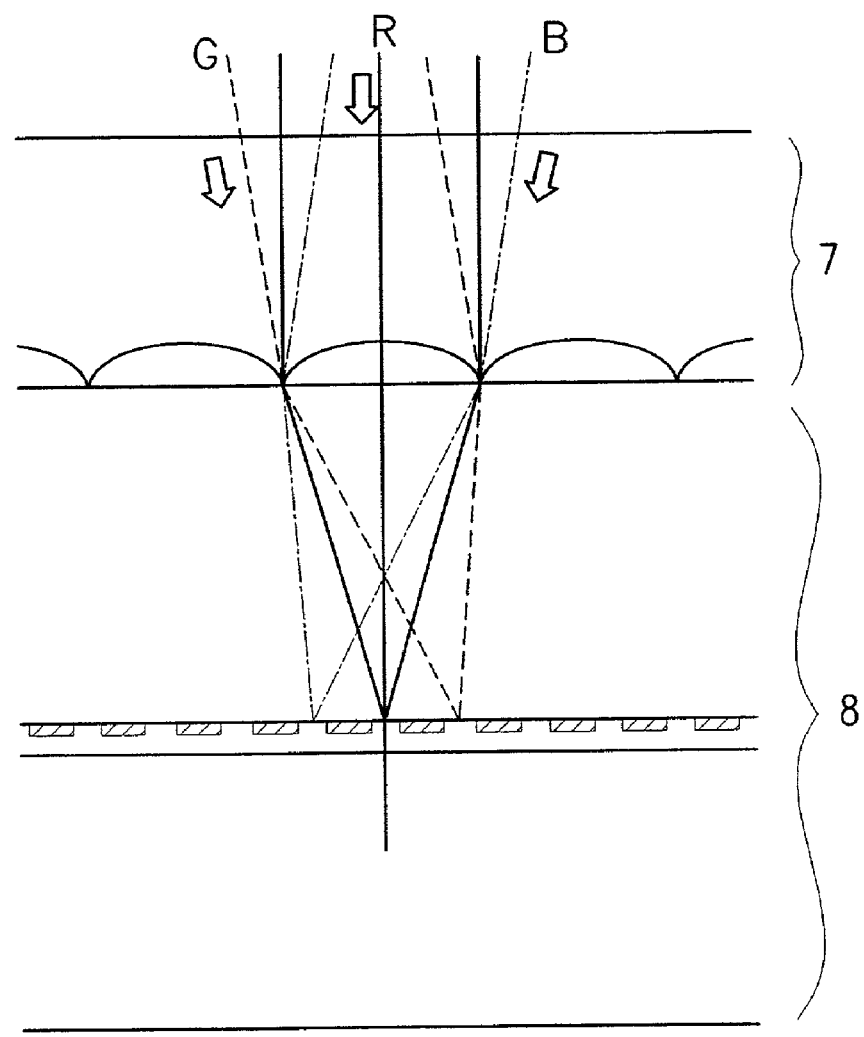
FIG. 2 is a cross-sectional view schematically illustrating the liquid crystal display panel shown in FIG. 1.

As shown in FIG. 1, the R, G and B light rays, impinging on the liquid crystal display panel 8, have been produced by getting the white light, radiated from the light source 1, separated by the dichroic mirrors 4, 5 and 6. The R, G and B light rays are incident onto the micro lens array 7 on the liquid crystal display panel 8 at mutually different angles. Accordingly, by appropriately setting the incidence angles of these R, G and B light rays, these light rays may be distributed through one of the micro lenses 7 to respective pixel regions corresponding to the three wavelength ranges as shown in FIG. 2. In this preferred embodiment, the micro lenses 7 have a focal length of about 255 μm so that an angle of about 5.8 degrees is formed between two of these light rays (or luminous fluxes). More specifically, as shown in FIG. 2, the R light ray is incident vertically onto the liquid crystal display panel 8, while each of the B and G light rays is incident thereon so as to form an angle of about 5.8 degrees with the R light ray.

Figure 3:
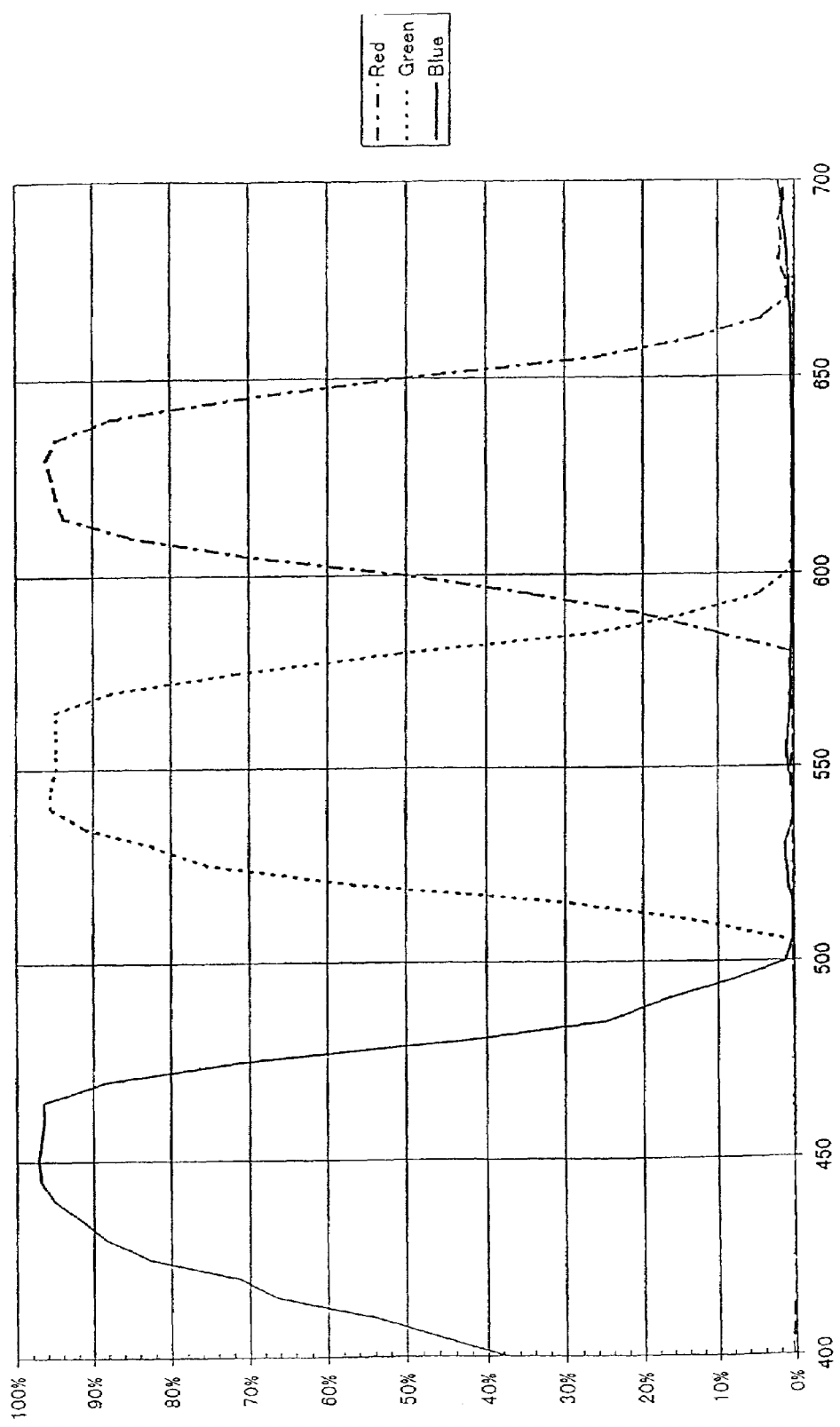
FIG. 3 is a graph showing the spectral characteristics of the dichroic mirrors shown in FIG. 1.

The dichroic mirrors 4, 5 and 6 may have spectral characteristics such as those shown in FIG. 3 and selectively reflect the green (G), red (R) and blue (B) light rays, respectively. The G light ray has a wavelength falling within a range of about 520 nm to about 580 nm, the R light ray has a wavelength falling within a range of about 600 nm to about 650 nm and the B light ray has a wavelength falling within a range of about 420 nm to about 480 nm.

In this preferred embodiment, the dichroic mirrors 4, 5 and 6 and the micro lens array 7 are used to converge the light rays corresponding to the three primary colors onto the pixel regions. Alternatively, any other optical element (e.g., a transmission type hologram having diffraction and spectral functions) may also be used.

As described above, the liquid crystal display panel 8 is driven by a noninterlaced scanning technique. Accordingly, the display panel 8 displays 60 frames per second. Thus, the time allotted to each frame (i.e., a frame time interval T) is about 1/60 second. That is to say, T=1/60 seconds≈16.6 milliseconds.

It should be noted that if the display panel 8 is driven by an interlaced scanning technique, the scan lines on the screen are grouped into even-numbered scan lines and odd-numbered scan lines. In the interlaced scanning, either all of these even-numbered scan lines or all of these odd-numbered scan lines are alternately activated. That is to say, when the even-numbered scan lines are refreshed in one field, the odd-numbered scan lines are refreshed in the next field. Accordingly, in that case, the frame time interval T is about 1/30 second≈33.3 milliseconds. Also, the time allotted to each of the even- and odd-numbered fields that make up one frame (i.e., one field time interval) is approximately 1/60 second≈16.6 milliseconds.

In this preferred embodiment, the information (or data) representing the respective frames that make up one image is sequentially stored on frame memories. And in accordance with the information that has been selectively read out from the frame memories, multiple subframes are formed one after another. Hereinafter, it will be described in detail how to form the subframes.

Figure 4:
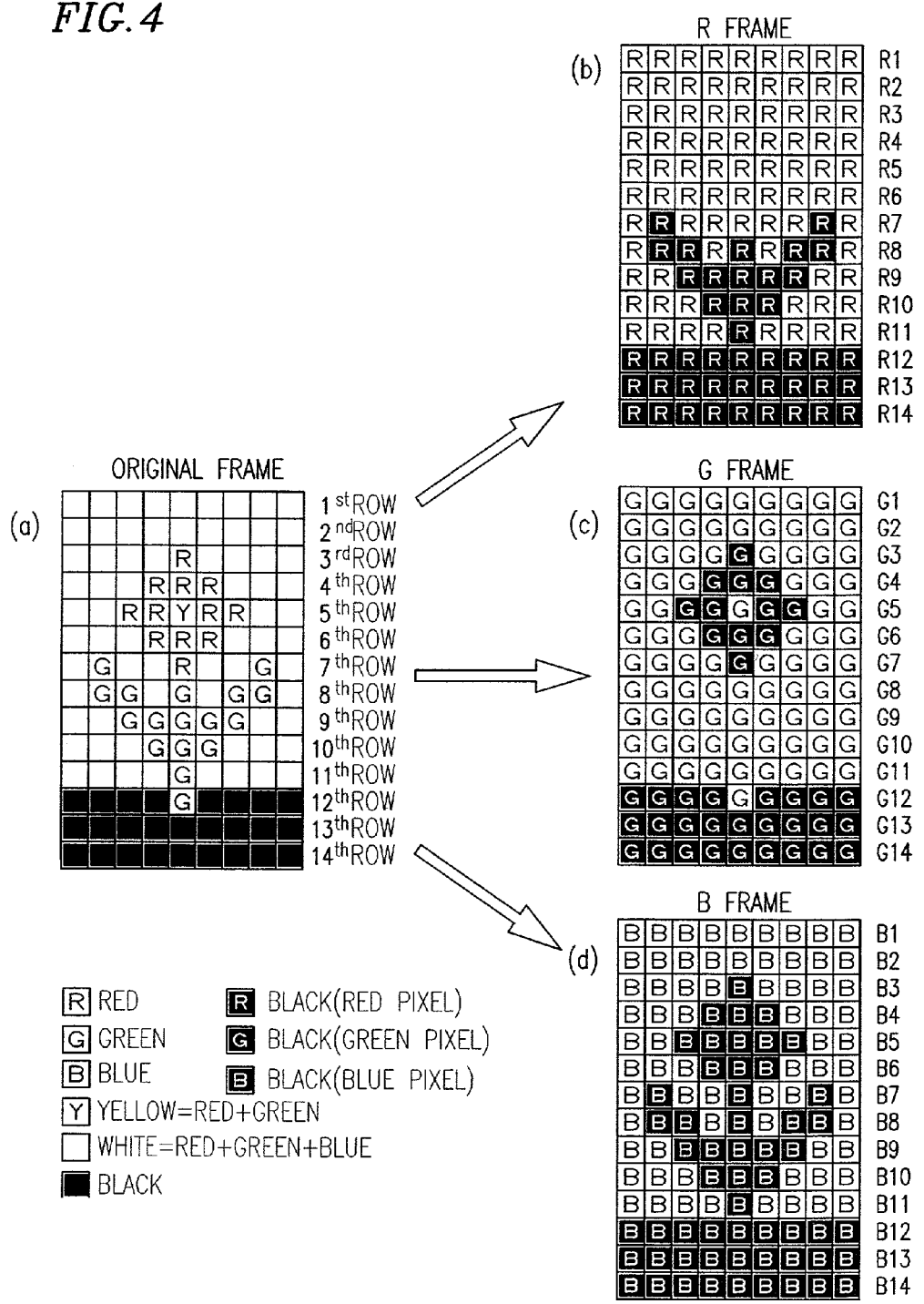
FIG. 4 illustrate how respective color image frames are produced from an original image frame.

For example, suppose a frame represents an image such as that shown in (a) of FIG. 4. This frame should be displayed in full colors, and the colors of the respective pixels are determined in accordance with the data defining this frame.

In this preferred embodiment, the R, G and B light rays, which have been modulated at mutually different pixel regions of the single display panel 8, are sequentially irradiated onto the same area on the projection plane 13 to form one pixel thereon. That is to say, taking an arbitrary pixel on the projection plane 13, the pixel is displayed by a method similar to a field sequential technique. However, the method of this preferred embodiment is significantly different from the known field sequential method in that the R, G and B light rays that make up one pixel have been modulated at mutually different pixel regions of the single display panel 8.

Figure 5A:
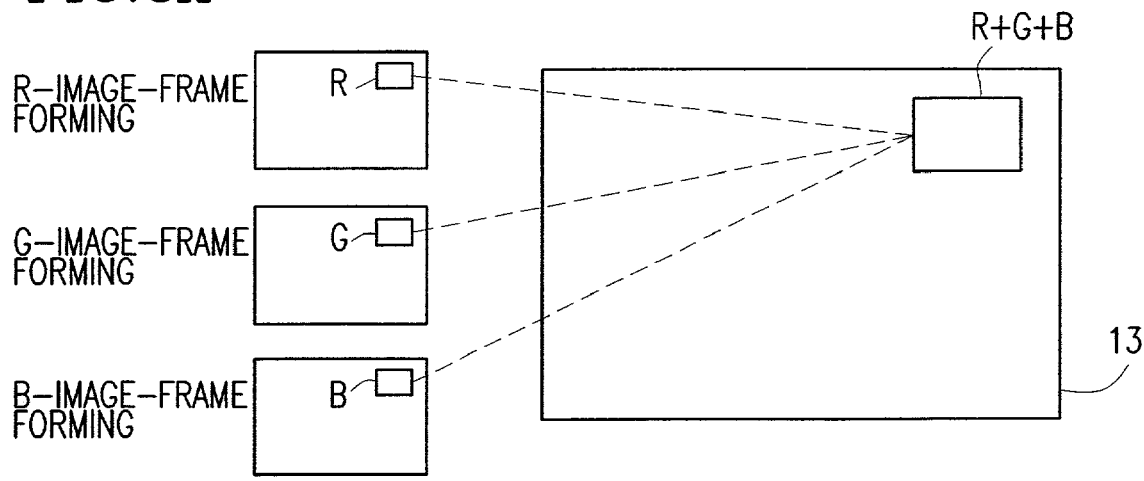
FIGS. 5A, 5B and 5C illustrate how the color display principle of the present invention is different from the conventional color display principles.

The conventional three-panel projection type display device separates the image data representing one frame into three data subsets corresponding to the R, G and B light rays, thereby preparing three data subsets representing the three frames for the R, G and B image portions as shown in (b)–(d) of FIG. 4. These three frames representing the R, G and B image portions will be herein referred to as "R, G and B image frames" for convenience sake. Then, the R, G and B image frames are displayed simultaneously by three display panels provided for these images frames so as to be superimposed one upon another on the projection plane 13. FIG. 5A schematically illustrates how the R, G and B image frames are superimposed one upon another for a particular pixel on the projection plane 13.

Figure 5B:
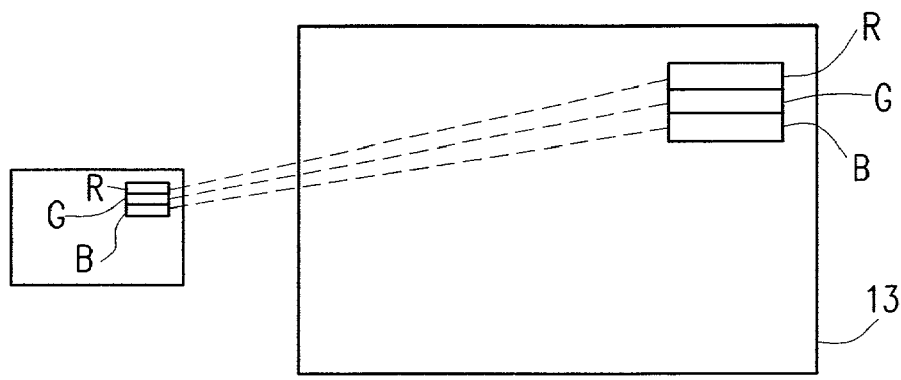

In a conventional single-panel projection type display device on the other hand, pixel regions for the R, G and B light rays are provided at mutually different positions of the single display panel. In accordance with the data that should represent the R, G and B image frames, the R, G and B light rays are modulated at their respective pixel regions, thereby forming a color image on the projection plane. In this case, an area on the projection plane that has a size smaller than the spatial resolution of the human visual sense is illuminated with the R, G and B light rays. Accordingly, even though the R, G and B light rays are actually separated from each other spatially, the human eyes sense as if a single pixel had been formed on the projection plane or screen. FIG. 5B illustrates how virtually one particular pixel on the projection plane 13 is illuminated with the R, G and B light rays.

Figure 5C:
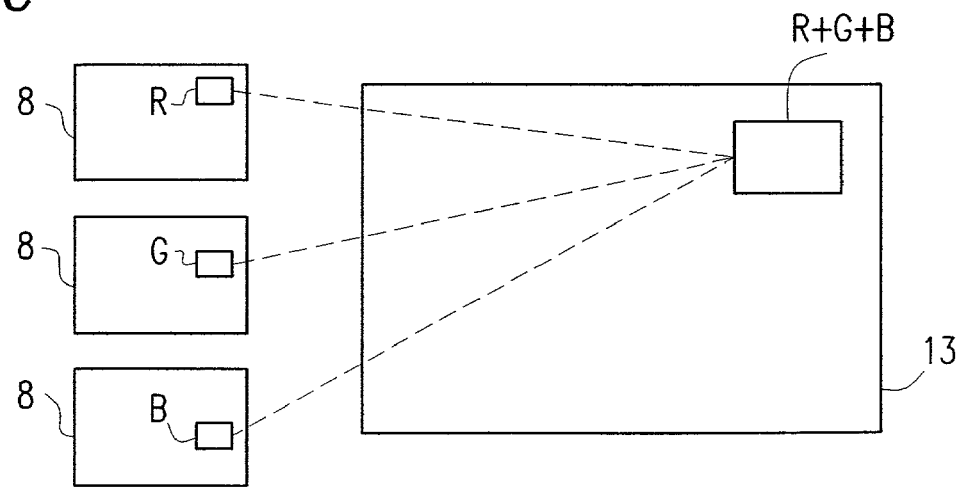
Figure 9:
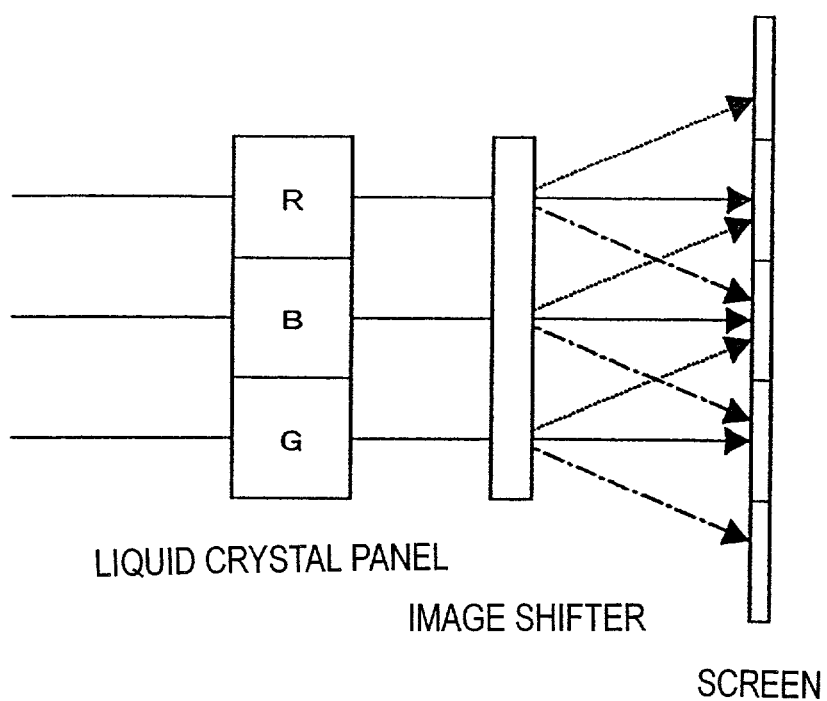
FIG. 9 illustrates how a display device according to a preferred embodiment of the present invention shifts respective image portions.

In contrast, unlike any of these conventional techniques, the single-panel projection type display device of this preferred embodiment sequentially illuminates the same area on the projection plane 13 with the R, G and B light rays that have been modulated at mutually different pixel regions of the single display panel 8, thereby forming a pixel on that same area. That is to say, taking an arbitrary pixel on the projection plane 13, the pixel is displayed by a method similar to the known field sequential technique. However, the method of this preferred embodiment is entirely different from the known field sequential technique in that the R, G and B light rays that make up one pixel have been modulated at mutually different pixel regions of the single display panel. FIG. 5C schematically illustrates how the R, G and B light rays that are irradiated by a time-sharing technique are combined for a particular pixel on the projection plane 13 in one frame interval. The three images shown on the left-hand side of FIG. 5C correspond to the three mutually different subframes produced by the single display panel 8. FIG. 9 is a side view schematically illustrating how the subframes are shifted in this preferred embodiment.

As can be easily seen from FIGS. 5A through 5C, even though just one display panel is used in this preferred embodiment, a full-color image can be displayed at as high resolution and brightness as those realized by the three-panel type.

Next, it will be described in detail with reference to FIG. 6 how the subframe is formed.

Figure 6:
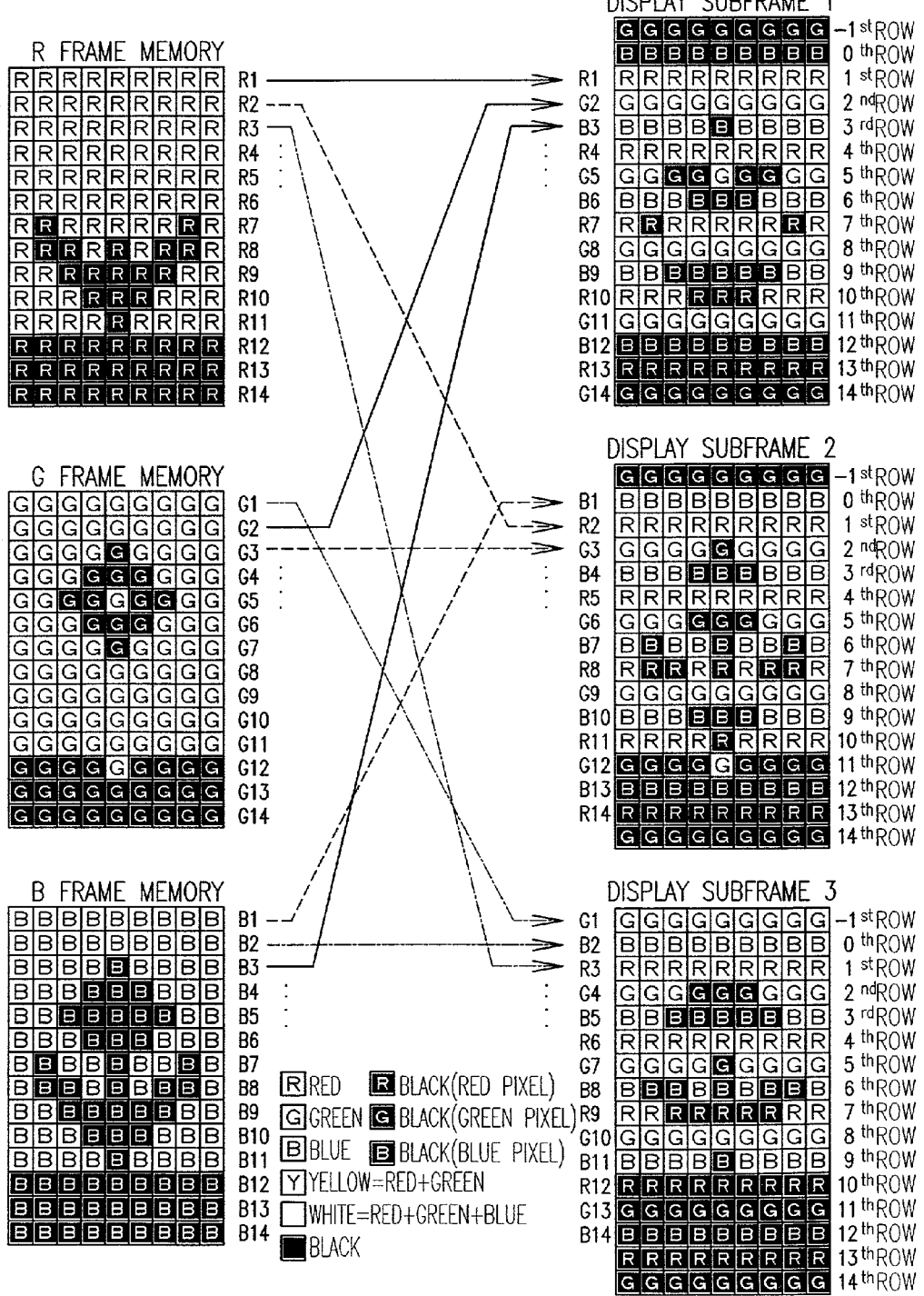
FIG. 6 illustrates how three sets of subframe data are generated from three sets of frame data corresponding to the three primary colors.

The left-hand side of FIG. 6 illustrates the three data sets representing R, G and B frames that are stored on their respective frame memories (which will be herein referred to as "R, G and B frame memories", respectively). On the other hand, the right-hand side of FIG. 6 illustrates subframes Nos. 1, 2 and 3 that are to be displayed sequentially on the single display panel. In this preferred embodiment, subframe No. 1 is displayed on the projection plane during the first one-third of a frame interval (i.e., a first subframe interval). During the next one-third (i.e., second subframe interval), subframe No. 2 is displayed. And during the last one-third (i.e., third subframe interval), subframe No. 3 is displayed. In this preferred embodiment, these three subframes are viewed by the observer's eyes and combined together while being shifted from each other with time as shown in FIG. 7. As a result, an original image (or a full frame image) such as that shown in (a) of FIG. 4 is recognized by the observer's eyes.

Next, it will be described in detail how the data is arranged in a subframe by taking subframe No. 1 as an example.

As shown in FIG. 6, the data representing the first row of the pixel region for displayed subframe No. 1 has been stored on the first row R1 of pixels in the R frame memory. The data representing the second row of the pixel region for displayed subframe No. 1 has been stored on the second row G2 of pixels in the G frame memory. The data representing the third row of the pixel region for displayed subframe No. 1 has been stored on the third row B3 of pixels in the B frame memory. And the data representing the fourth row of the pixel region for displayed subframe No. 1 has been stored on the fourth row R4 of pixels in the R frame memory. The data representing displayed subframe No. 1 will be made up in the same manner after that.

The data representing displayed subframe No. 2 or 3 is also collected as in displayed subframe No. 1. As for displayed subframe No. 2, for example, the data representing the zeroth row of its pixel region has been stored on the first row B1 of pixels in the B frame memory. The data representing the first row of the pixel region for displayed subframe No. 2 has been stored on the second row R2 of pixels in the R frame memory. The data representing the second row of the pixel region for displayed subframe No. 2 has been stored on the third row G3 of pixels in the G frame memory. And the data representing the third row of the pixel region for displayed subframe No. 2 has been stored on the fourth row B4 of pixels in the B frame memory.

In this manner, the data subsets that have been read out from the R, G and B frame memories are combined in a predetermined order, thereby compiling data representing each of the subframes to be displayed by a time-sharing technique. Thus, the data representing each subframe contains information about all of the three primary colors of R, G and B. However, as for each of these colors R, G and B, the information contained is about just one-third of the entire screen, spatially speaking. More specifically, as can be easily seen from FIG. 6, the R information contained in displayed subframe No. 1 is concerned with just the first, fourth, seventh, tenth pixel rows, etc. of the frame to be formed. The R information about the other pixel rows of the frame is allocated to display subframes Nos. 2 and 3.

In this preferred embodiment, information about the same color always exists in each pixel region of the display panel, and each subframe does not form a full frame image. However, sifting of subframes that are displayed on the display panel synthesizes the subframes to form a full frame full color image. It should be noted that the total number of pixel rows in a pixel region of the display panel is larger by two than the number of pixel rows that make up one subframe stored on each of the frame memories as shown in FIG. 6. These two rows are provided as a margin for image shifting.

In the foregoing description, the data representing the R, G and B image portions are once stored on the three frame memories, respectively, and then image data representing three subframes is generated for the sake of simplicity. According to a preferred embodiment, however, the image data representing subframes Nos. 1 to 3 (i.e., display subframes) shown in FIG. 6 is directly generated from the image data representing the original frame and then stored on their associated frame memories as will be described in further detail later.

Next, it will be described with reference to FIG. 8 how those subframes mutually shifted are synthesized into one image frame.

Figures 8A, 8B:
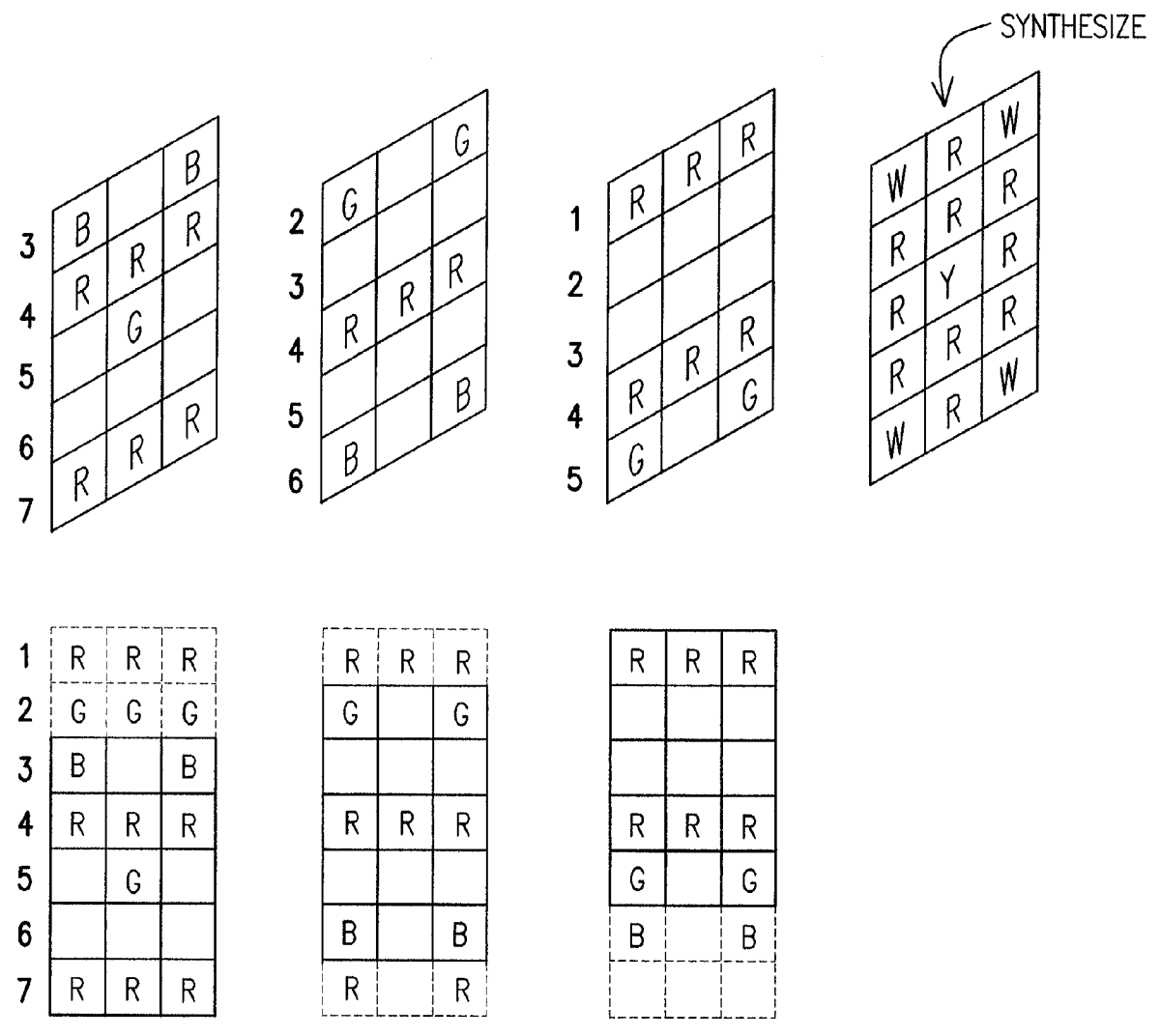

Referring to FIG. 8A, illustrated is a perspective view showing respective parts of three subframes that have been projected onto a projection plane such as a screen. In FIG. 8A, subframes Nos. 1, 2 and 3 and synthesized frame are illustrated from left to right. FIG. 8B illustrates the pixel regions of the display panel that are associated with the subframes Nos. 1, 2 and 3, respectively, from left to right. A portion of the subframe No. 1 including the third through seventh rows thereof, a portion of the subframe No. 2 including the second through sixth rows thereof, and a portion of the subframe No. 3 including the first through fifth rows thereof are spatially superimposed one upon another on the projection plane although these portions are projected at mutually different points in time. As a result, a single frame is formed on the projection plane.

The R, G or B portions of the pixel regions are fixed on the display panel as shown in FIG. 8B. However, the optical paths of the subframes are shifted by the image shifter provided between the display panel and the projection plane, thereby realizing the image synthesis of the subframes as shown in FIG. 8A.

In this preferred embodiment, the subframes are shifted by the image shifter 10 disposed between the liquid crystal display panel 8 and the screen 13 as shown in FIG. 1. An image shifter as disclosed in Japanese Laid-Open Publication No. 7-36054 may be used as the image shifter 10. However, the present invention is not limited to the specific embodiment.

Next, an exemplary circuit configuration for the display device of this preferred embodiment will be described with reference to FIG. 10. In the circuit configuration illustrated in FIG. 10, subframe data is supplied from a video signal source to memories M1 through M6. These memories M1 through M6 do not have to be frame memories formed on separate chips but may also be the same number of memory areas provided in a single storage device.

The subframe signals stored on the memories M1 through M6 is sent out to a correction circuit by way of a signal controller. In this case, the signal controller reads out one of the subframe signals stored on the memories M1 through M6 as a current signal to be written onto the liquid crystal display panel and also reads out another one as a reference. Then, the signal controller supplies these two subframe signals to the correction circuit. In response, the correction circuit corrects the current signal in accordance with the reference signal to generate a corrected signal and then supplies the corrected signal to the source driver of the liquid crystal display panel.

A sync signal is sent out from a system controller to the source and gate drivers of the liquid crystal display panel. In response to this sync signal, the corrected signal is written onto the liquid crystal display panel. Also, the system controller supplies a control signal to the memories M1 through M6, signal controller and image shifter, thereby controlling the operation timings of these circuits.

Next, it will be described with reference to the following Table 1 which signals are input and output to/from which subframe signal storage sections (i.e., which ones of the memories M1 through M6) of this display device.

TABLE 1

|  | 1st frame | | | 2nd frame | | |
|---|---|---|---|---|---|---|
| Subframe No. | 1 | 2 | 3 | 1 | 2 | 3 |
| Memory from which reference signal is read | M6 | M1 | M2 | M3 | M4 | M5 |
| Memory from which current signal is read | M1 | M2 | M3 | M4 | M5 | M6 |
| Memories on which next signals are written | M4, M5, M6 | | | M1, M2, M3 | | |

As shown in Table 1, in a frame interval (i.e., of the "1$^{st}$ frame" shown in Table 1), the subframe signals representing the first, second and third subframes of the current frame, which have been stored on the memories M1, M2 and M3, are sequentially read out therefrom, supplied to the correction circuit and then written on the liquid crystal display panel. In the meantime, the subframe signals representing the first, second and third subframes of the next frame (i.e., the "2$^{nd}$ frame" shown in Table 1) that have been transmitted from the video signal source are input to, and stored on, the memories M4, M5 and M6.

In the next frame interval (i.e., of the "2$^{nd}$ frame" shown in Table 1), the subframe signals representing the first, second and third subframes of this frame, which have been stored on the memories M4, M5 and M6, are sequentially read out therefrom, supplied to the correction circuit and then written on the liquid crystal display panel. In the meantime, the subframe signals representing the first, second and third subframes of the third frame that have been transmitted from the video signal source are input to, and stored on, the memories M1, M2 and M3.

Supposing the frame frequency is 60 Hz, for example, the subframe frequency is 60×3=180 Hz in this preferred embodiment in which each frame is divided into three subframes. In this case, a subframe interval becomes about 5.6 ms. On the other hand, the response speed of a liquid crystal material is normally from about 10 ms to about 20 ms.

Figure 10:
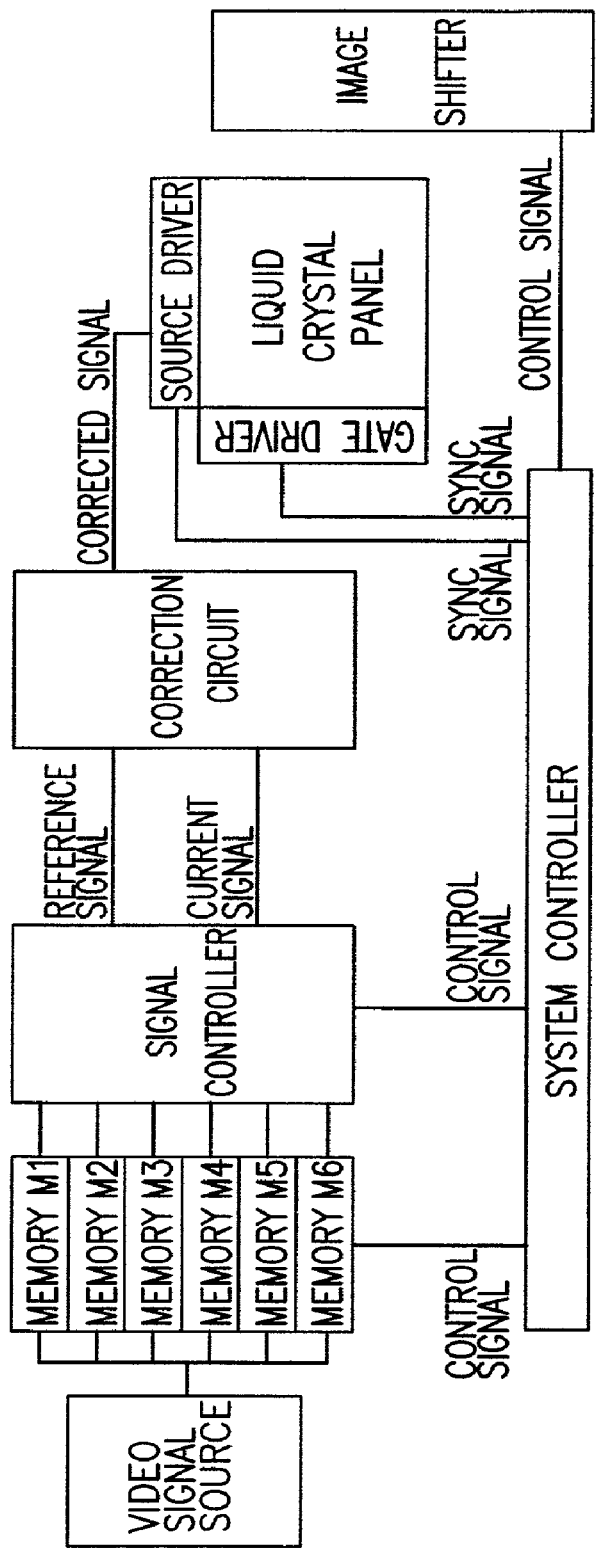
FIG. 10 illustrates an exemplary circuit configuration for a known display device.

To increase the response speed of the liquid crystal material, the display device having the configuration shown in FIG. 10 corrects a subframe signal representing the current subframe by reference to a subframe signal representing the previous subframe. That is to say, a subframe signal representing the second subframe is corrected by using a subframe signal representing the first subframe, and an representing the third subframe is corrected by using the subframe signal representing the second subframe. Each of the subframe signals representing the second and third subframes is corrected by reference to the subframe signal representing the previous subframe belonging to the same frame. Accordingly, the subframe signal to be referred to has been stored within the same frame interval.

However, if the subframe signals are input and output as shown in Table 1 by using the device shown in FIG. 10, the reference subframe needed to correct the first subframe of the first frame is the third subframe (i.e., the last subframe) of the previous frame (not shown in Table 1). The subframe signal representing the third subframe of the previous frame has been written on the memory M6. Nevertheless, when the first subframe of the first frame is displayed, the subframe signals of the second frame are written on the memories M4, M5 and M6. Accordingly, the subframe signal representing the last subframe of the previous frame, which is needed to correct the first subframe of the first frame, no longer exists in any of the memories M1 through M6.

Figure 11:
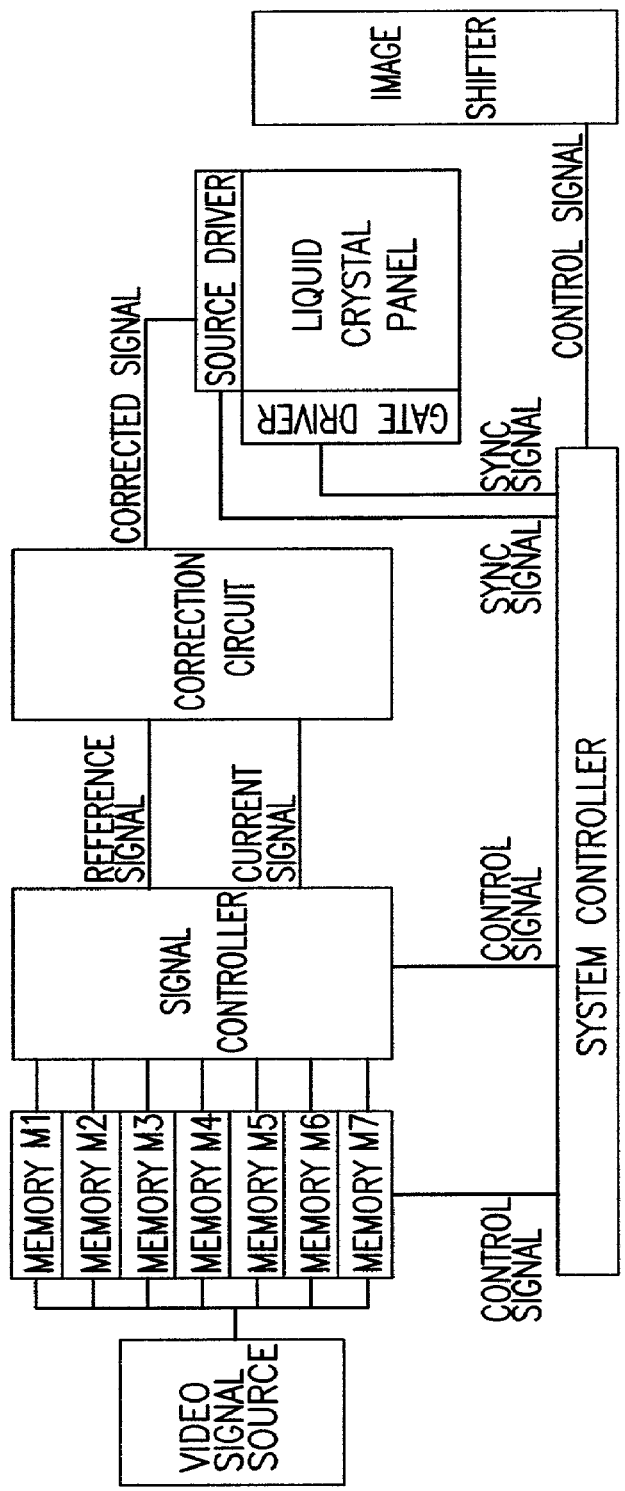
FIG. 11 illustrates a circuit configuration for a display device according to a first specific preferred embodiment of the present invention.

To overcome this problem, the display device of this preferred embodiment has a circuit configuration including an additional subframe signal storage section (i.e., memory M7) for the first subframe as shown in FIG. 11. The following Tables 2 and 3 show which signals are input and output to/from which memories according to this preferred embodiment:

TABLE 2

|  | 1st frame | | | 2nd frame | | |
|---|---|---|---|---|---|---|
| Subframe No. | 1 | 2 | 3 | 1 | 2 | 3 |
| Memory from which reference signal is read | M7 | M1 | M2 | M3 | M4 | M5 |
| Memory from which current signal is read | M1 | M2 | M3 | M4 | M5 | M6 |
| Memories on which next signals are written | M4, M5, M6 | | | M7, M1, M2 | | |

TABLE 3

|  | 3rd frame | | | 4th frame | | |
|---|---|---|---|---|---|---|
| Subframe No. | 1 | 2 | 3 | 1 | 2 | 3 |
| Memory from which reference signal is read | M6 | M7 | M1 | M2 | M3 | M4 |
| Memory from which current signal is read | M7 | M1 | M2 | M3 | M4 | M5 |
| Memories on which next signals are written | M3, M4, M5 | | | M6, M7, M1 | | |

According to this preferred embodiment, even when the subframe signal representing the first subframe of a current frame is read out and written on the display panel, the subframe signal representing the third subframe (i.e., the last subframe) of the previous frame is retained (i.e., not erased). For example, in the second frame interval, the subframe signals of the next frame are written on the memories M7, M1 and M2. When the subframe signal representing the first subframe of the second frame is read out from the memory M4, the subframe signal representing the third subframe of the previous frame is stored on the memory M3. And this subframe signal is retained on the memory M3 throughout the second frame interval. The signal controller reads out the current signal from the memory M4 and the reference signal from the memory M3, respectively. And the correction circuit generates a corrected signal from these signals.

In this manner, according to this preferred embodiment, a subframe signal representing the first subframe of a current frame can be corrected appropriately by reference to a subframe signal representing the last subframe of the previous frame.

CORRECTION METHOD

Hereinafter, it will be described in detail how to correct a subframe signal according to this preferred embodiment.

As described above, if three subframes are sequentially displayed one after another at a frame frequency of 60 Hz, the time it takes to display each of these three subframes will be 1 s/60 Hz/3=about 5.6 ms. However, the response speed of a liquid crystal material is normally about 10 ms to about 20 ms. When one gray-scale level is replaced with another, the delay in response of the liquid crystal material tends to further increase.

Also, in an active matrix addressing technique, in which thin-film transistors (TFTs) are used as pixel switching elements, the response speed further decreases due to the following phenomenon.

Figure 12:
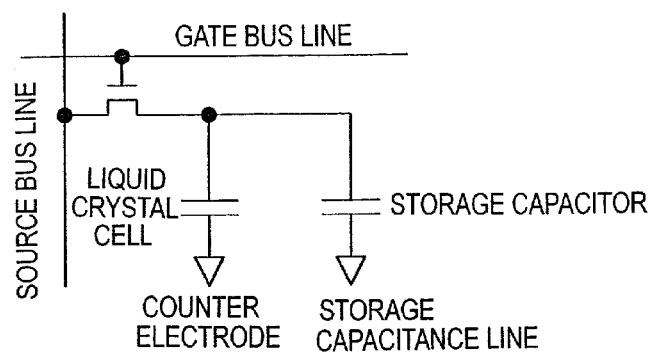
FIG. 12 illustrates an equivalent circuit of a liquid crystal cell for a typical liquid crystal display device.

Suppose a situation where a signal voltage V is applied to a liquid crystal cell with a capacitance Clc and to a storage capacitor with a capacitance Cs by way of a TFT so that a gray-scale level is displayed by the liquid crystal cell. FIG. 12 illustrates an equivalent circuit representing such a situation.

Figure 13:
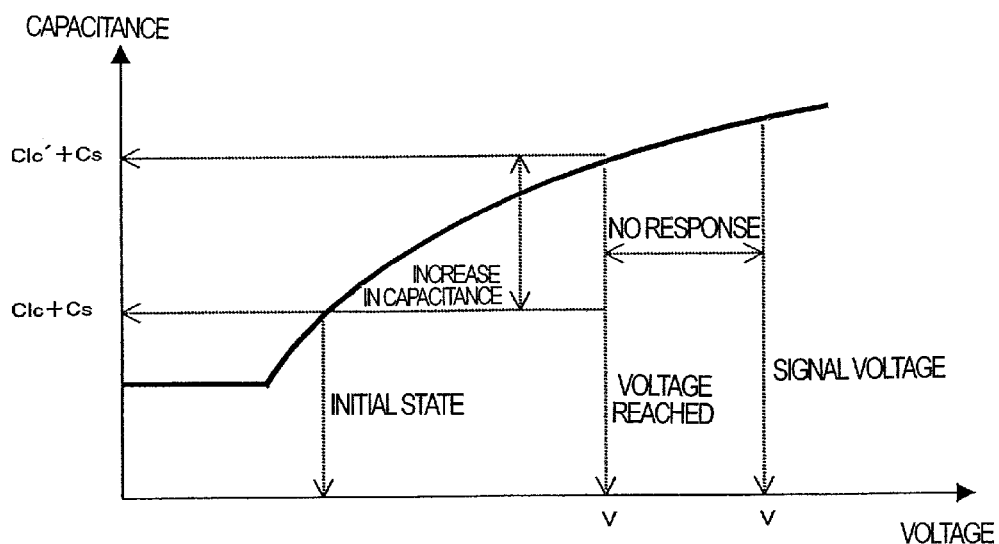
FIG. 13 is a graph showing a relationship between the signal voltage applied to the liquid crystal layer of the liquid crystal display device shown in FIG. 12 and the total capacitance Clc+Cs.

When a liquid crystal material starts to respond, the material changes its effective dielectric constant, which in turn changes the capacitance Clc. FIG. 13 illustrates a relationship between the signal voltage V applied to the liquid crystal material and the total capacitance Clc+Cs.

Supposing the liquid crystal capacitance will increase to reach Clc' and a voltage V' will be applied to the liquid crystal cell when one frame interval has passed since the signal voltage started to be applied, the following Equation (1) is satisfied:

$$(Clc'+Cs) \cdot V' = (Clc+Cs) \cdot V \quad (1)$$

because the quantities of charge stored on the liquid crystal cell and storage capacitor are retained.

As shown in FIG. 13, when one frame interval has passed since the application of the signal voltage V, the capacitance of the liquid crystal cell will increase from Clc to Clc'. As a result, the voltage reached will decrease from V to V'. That is to say, even if the signal voltage to be applied should be V, the voltage could reach no higher than V', which is lower than V.

Figure 14A:
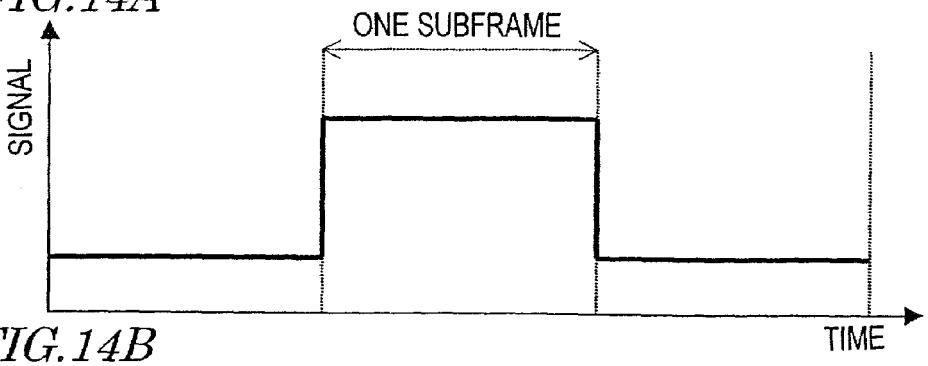
FIG. 14A is a graph showing the voltage waveform of a subframe signal to be applied to the liquid crystal layer.
Figure 14B:
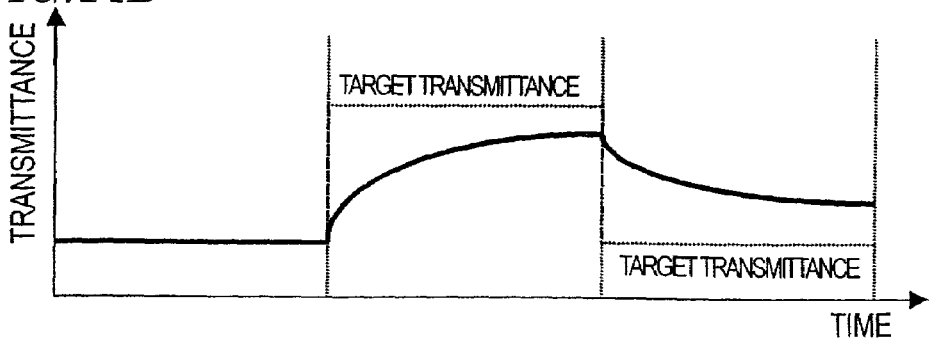
FIG. 14B is a graph showing the response waveform of the voltage created in the liquid crystal layer.

Suppose a situation where a gray-scale voltage at a pixel changes as shown in FIG. 14A. For example, suppose the gray-scale voltage has a level No. 32 for the first subframe, which increases to a level No. 128 for the second subframe but decreases to the level No. 32 again for the third subframe. In that case, due to the increase in capacitance and the delay in response, the voltage created in the liquid crystal layer should have a response curve such as that shown in FIG. 14B. As can be seen from FIG. 14B, the response curve is not an ideal one.

Figure 15A:
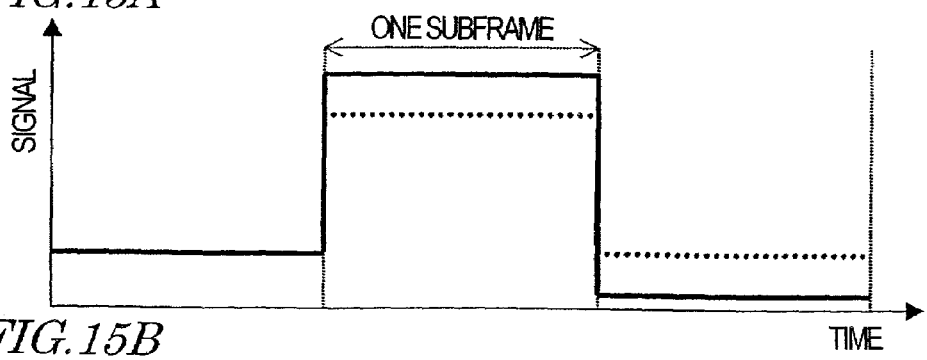
FIG. 15A is a graph showing the voltage waveform of a subframe signal to be applied to the liquid crystal layer.
Figure 15B:
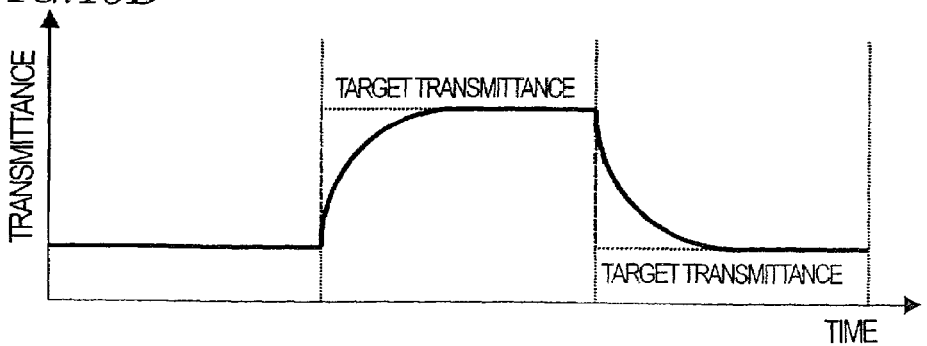
FIG. 15B is a graph showing the response waveform of the voltage created in the liquid crystal layer.

Thus, according to this preferred embodiment, a corrected signal voltage such as that shown in FIG. 15A is applied. To accelerate the response of the liquid crystal material and to compensate for the shortage of charge due to the change in capacitance of the liquid crystal material, the signal voltage shown in FIG. 15A has a waveform obtained by correcting the original signal voltage waveform. As a result, a response curve closer to the ideal one can be obtained as shown in FIG. 15B.

Figure 16:
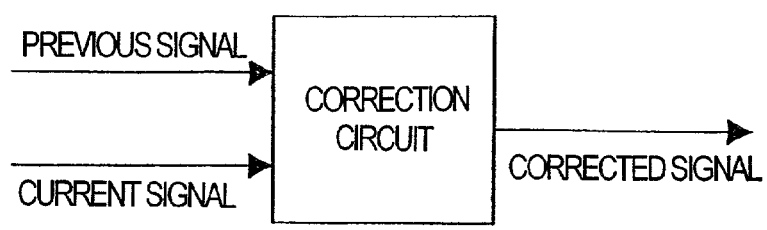
FIG. 16 schematically illustrates what signals are input and output to/from a correction circuit for use in various preferred embodiments of the present invention.

Next, it will be described with reference to FIG. 16 how to correct a subframe signal. FIG. 16 illustrates a signal correction circuit. This signal correction circuit receives two subframe signals representing the current and previous subframes that have been stored on two memories and performs an arithmetic operation on these two subframe signals. The arithmetic operation may be given by the following Equation (2):

Corrected signal=current signal+(current signal−previous signal)/$M$ (2)

If $M$ of Equation (2) is an $n^{th}$ power of two, then the correction circuit may have its configuration simplified. In the following illustrative example, M is supposed to be four.

Supposing the corrected subframe signal is $SA'_n$, the subframe signal representing the current subframe is $SA_n$ and the subframe signal representing the reference subframe is $SA_{n-}$, Equation (2) may be represented as the following Equation (3):

$$SA'_n = SA_n + (SA_n - SA_{n-1})/M \quad (3)$$

In the example illustrated in FIGS. 15A and 15B, the subframe signal representing the second subframe (having the gray-scale level No. 128) is corrected as follows by reference to the subframe signal representing the first subframe (having the gray-scale level No. 32):

128+(128−32)/4=152

As a result of this arithmetic operation, the corrected signal output from the correction circuit has a gray-scale level No. 152. This means that a signal voltage having a gray-scale level higher than that of the original subframe signal is applied to the liquid crystal panel as shown in FIG. 15A.

In the same way, the subframe signal representing the third subframe (having the gray-scale level No. 32) is corrected as follows by reference to the subframe signal representing the second subframe (having the gray-scale level No. 128):

32+(32−128)/4=8

As a result of this arithmetic operation, the corrected signal output from the correction circuit has a gray-scale level No. 8. This means that a signal voltage having a gray-scale level lower than that of the original subframe signal is applied to the liquid crystal panel as shown in FIG. 15A.

According to an arithmetic operation like this, the corrected signal obtained has such a waveform as if a subframe signal representing the current frame had been overshot as shown in FIG. 15A. As a result, the effective response speed of the liquid crystal material can be increased.

It should be noted that when Equation (3) is applied, the gray-scale level of the corrected signal may be greater than 255 or smaller than 0. In that case, if the result of the arithmetic operation requires that the corrected signal have a gray-scale level of 256 or more, then the corrected signal to be output may be regarded as having a gray-scale level of 255. On the other hand, if the result of the arithmetic operation requires that the corrected signal have a gray-scale level of less than 0, then the corrected signal to be output may be regarded as having a gray-scale level of 0. According to this method, the signal can be corrected accurately enough when an intermediate gray-scale level is replaced with another, thus causing no serious problems in practice. However, to make an even more accurate correction, additional power supplies for applying voltages corresponding to gray-scale levels of 256 or more and gray-scale levels of less than 0 should preferably be provided for the source driver. More specifically, by preparing gray-scale levels of 256, 257 and so on and gray-scale levels of −1, −2 and so on, the correction can be made even more accurately.

In the example described above, M is supposed to be fixed in Equation (2). Alternatively, this M value may be changed to make an even more accurate correction. For example, the M value may be selected from the group consisting of 2, 4 and 8 depending on the level range of subframe signals representing the current frame. Also, to make an even more accurate correction, a lookup table is preferably used instead of Equation (3).

Figure 17:
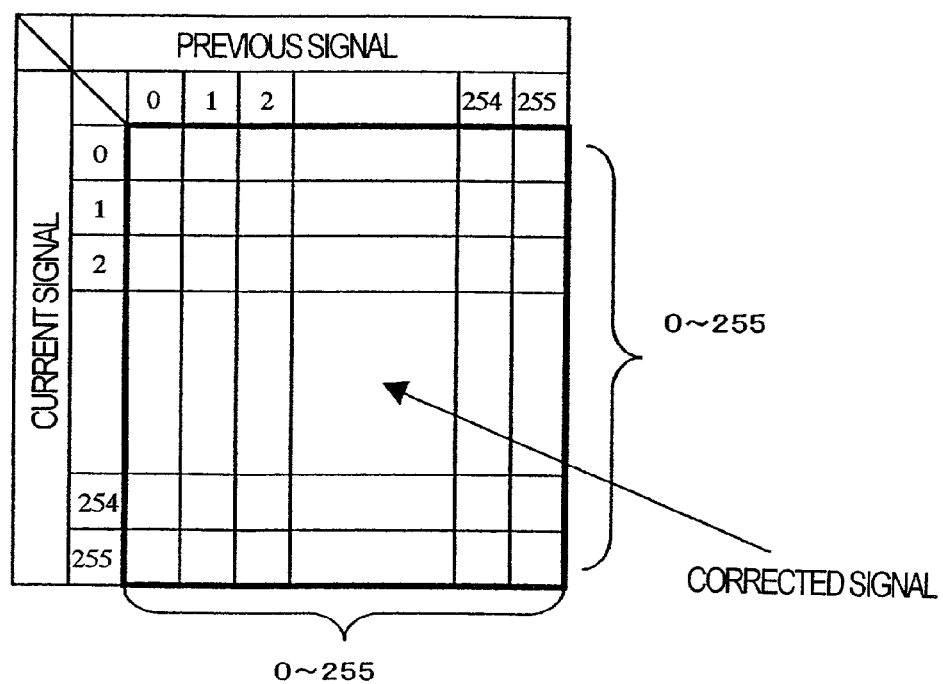
FIG. 17 schematically illustrates a lookup table.

The lookup table may have a two-dimensional matrix structure made up of 256 rows by 256 columns as shown in FIG. 17, for example. The level of a corrected signal may be determined by the combination of gray-scale levels the current and previous (or reference) signals can take. That is to say, in this lookup table, the level of the corrected signal may be stored at an intersection between a row representing the gray-scale level of the current signal and a column representing the gray-scale level of the previous signal. In this manner, by preparing a lookup table that describes the best corrected signals, each of which has been determined in accordance with the relationship between the current and previous signals, the correction of a given subframe signal can be optimized.

Figure 18:
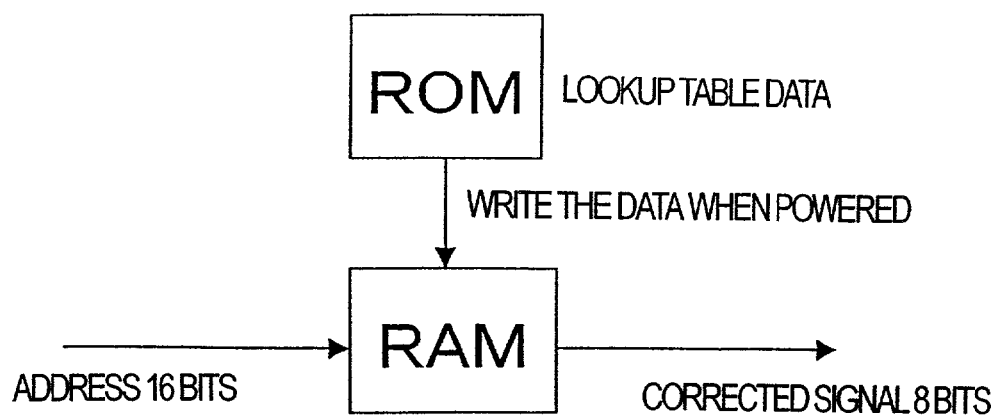
FIG. 18 illustrates how the lookup table shown in FIG. 17 may be made.

The lookup table may be compiled by using a RAM such as a synchronous dynamic RAM (SDRAM) and a read-only memory (ROM) in combination as shown in FIG. 18, for example. In that case, the lookup table data may be stored in advance on the ROM. And when the display device is powered, the data may be read out from the ROM and then transferred to, and stored on, the RAM. Where an address at the RAM has 16 bits, the high-order 8 bits of the address may be specified by a subframe signal representing the current subframe (having 256 gray-scale levels) while the low-order 8 bits thereof may be specified by a subframe signal representing the previous subframe (also having 256 gray-scale levels). At the address specified in this manner, 8-bit correction data (having 256 gray-scale levels) is stored. In response to a given address, the data stored at that address of the RAM is read out, thereby obtaining a corrected signal. In the example illustrated in FIG. 18, the corrected signal is read out from the RAM. This is because the RAM has a processing rate higher than that of the ROM. By adopting a method like this, the display device can be operated fast enough at a clock frequency of several tens of MHz.

It should be noted that if a subframe signal is represented as a digital signal of q bits (where q is an integer equal to or greater than 2), then only the high-order p bit(s) (where p is an integer equal to or greater than 1 and q>p) may be corrected without correcting all of these q bits. In that case, the signal cannot be corrected so completely as in the situation where those q bits are all corrected. However, the resolution rather increases and the circuit size can be reduced, thus contributing to cost reduction.

EMBODIMENT 2

Figure 19:
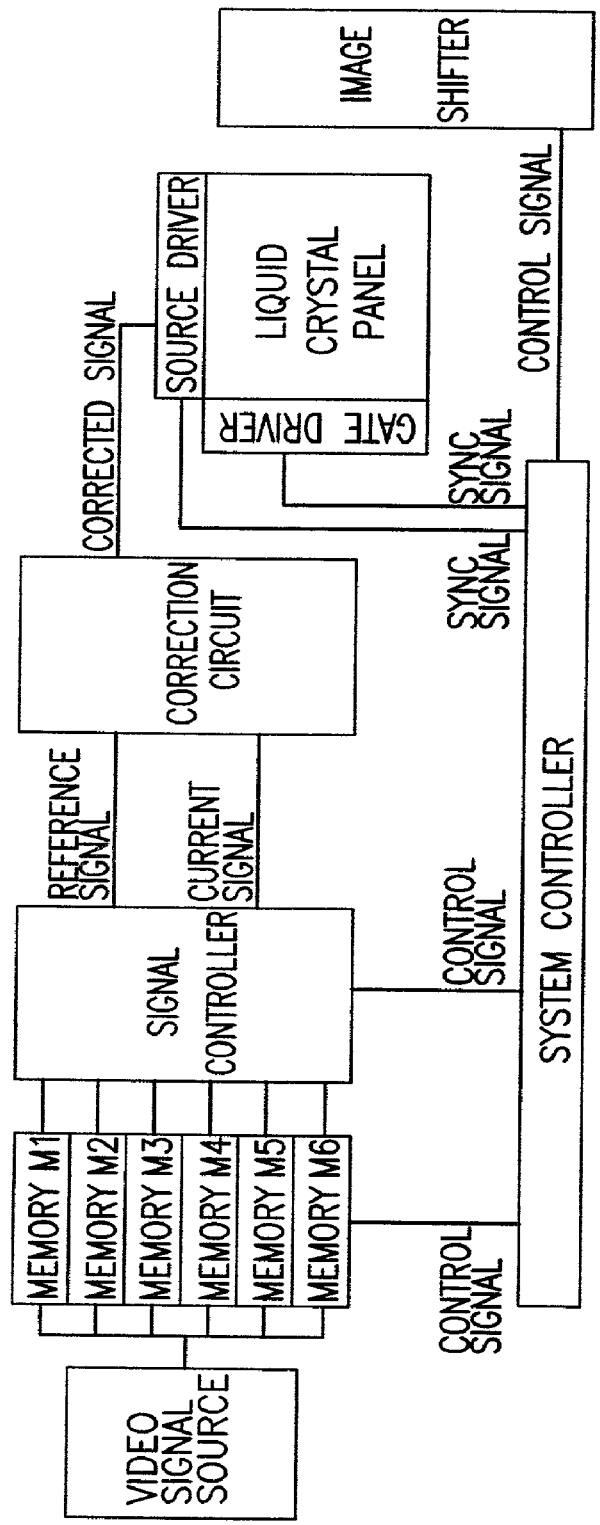
FIG. 19 illustrates a circuit configuration for a display device according to a second specific preferred embodiment of the present invention.

Next, a display device according to a second specific preferred embodiment of the present invention will be described with reference to FIG. 19. In the first preferred embodiment of the present invention described above, the seven memories M1 through M7 are used to correct the subframe signals representing the first through third subframes of each frame. On the other hand, according to this second preferred embodiment, the subframe signals representing the first through third subframes of each frame can be corrected by using six memories.

In this preferred embodiment, a subframe signal representing the first subframe of a current frame is not corrected by reference to a subframe signal representing the last subframe of the previous frame but by using a subframe signal representing the last subframe of the current frame. On the other hand, a subframe signal representing the second or third subframe of the current frame is corrected by reference to a subframe signal representing the previous (i.e., the first or second) subframe of the same frame as in the first preferred embodiment. The following Table 4 shows from which memory a reference signal should be read out to correct a current signal in this preferred embodiment:

TABLE 4

| | 1st frame | | | 2nd frame | | |
|---|---|---|---|---|---|---|
| Subframe No. | 1 | 2 | 3 | 1 | 2 | 3 |
| Memory from which reference signal is read | M3 | M1 | M2 | M6 | M4 | M5 |
| Memory from which current signal is read | M1 | M2 | M3 | M4 | M5 | M6 |
| Memories on which next signals are written | M4, M5, M6 | | | M1, M2, M3 | | |

In displaying a still picture, a subframe signal representing a current frame and a subframe signal representing the previous frame have the same contents. Accordingly, the last subframe of the current frame is the same as that of the previous frame. Thus, there will be no problem even if a subframe signal representing the first subframe of a current frame is corrected by the method of this second preferred embodiment. Also, if the image to be displayed is not a still picture but a moving picture with relatively little motion, there will not be so much difference between the subframe signals representing two contiguous frames of the moving picture. Thus, even if those subframe signals are corrected by the method of this second preferred embodiment, the correction is still sufficiently effective in many cases. For example, when a moving picture we often look at on TV is displayed by the method of this preferred embodiment, an image of quality, which is sufficiently higher compared to the situation where no signal correction is carried out at all, can be obtained, and the resolution can also be increased.

In this preferred embodiment, a subframe signal representing the first subframe of a current frame is corrected by using a subframe signal representing the last subframe of the same frame. However, if the order in which the respective subframes of one frame are displayed is different from the order in which those of another frame are displayed, a subframe signal representing another subframe of the current frame is preferably used. Strictly speaking, a subframe equivalent to the last subframe of the previous frame is preferably selected from the subframes of the current frame and a subframe signal representing the first subframe of the current frame should be corrected by reference to the equivalent subframe. As used herein, a subframe is "equivalent" to a given subframe if these two subframes are displayed such that a pixel of the same color is displayed at the same position for both of these two subframes. An display device may be driven in such a manner that the position of the last subframe of a current frame is different from that of the last subframe of the previous frame. In such a situation, in correcting a subframe signal representing the first subframe of a current frame, the second subframe of the current frame may have the same pixel position as the last subframe of the previous frame and may preferably be used as a reference subframe. Then, the subframe signal representing the first subframe of the current frame should preferably be corrected by using the subframe signal representing the second subframe of the same frame.

EMBODIMENT 3

Hereinafter, an display device according to a third specific preferred embodiment of the present invention will be described with reference to FIG. 20. In the first and second preferred embodiments of the present invention described above, one frame is divided into three subframes. Accordingly, each of these three subframes should be displayed at least once a frame interval, thus resulting in a high drive frequency.

In this third preferred embodiment, each frame is also divided into three subframes. However, just two subframe signals representing two of the three subframes are actually stored on memories and the number of subframes actually displayed per frame interval is also cut down to two. In this manner, the subframe frequency can be reduced from 180 Hz to 120 Hz.

Figure 20:
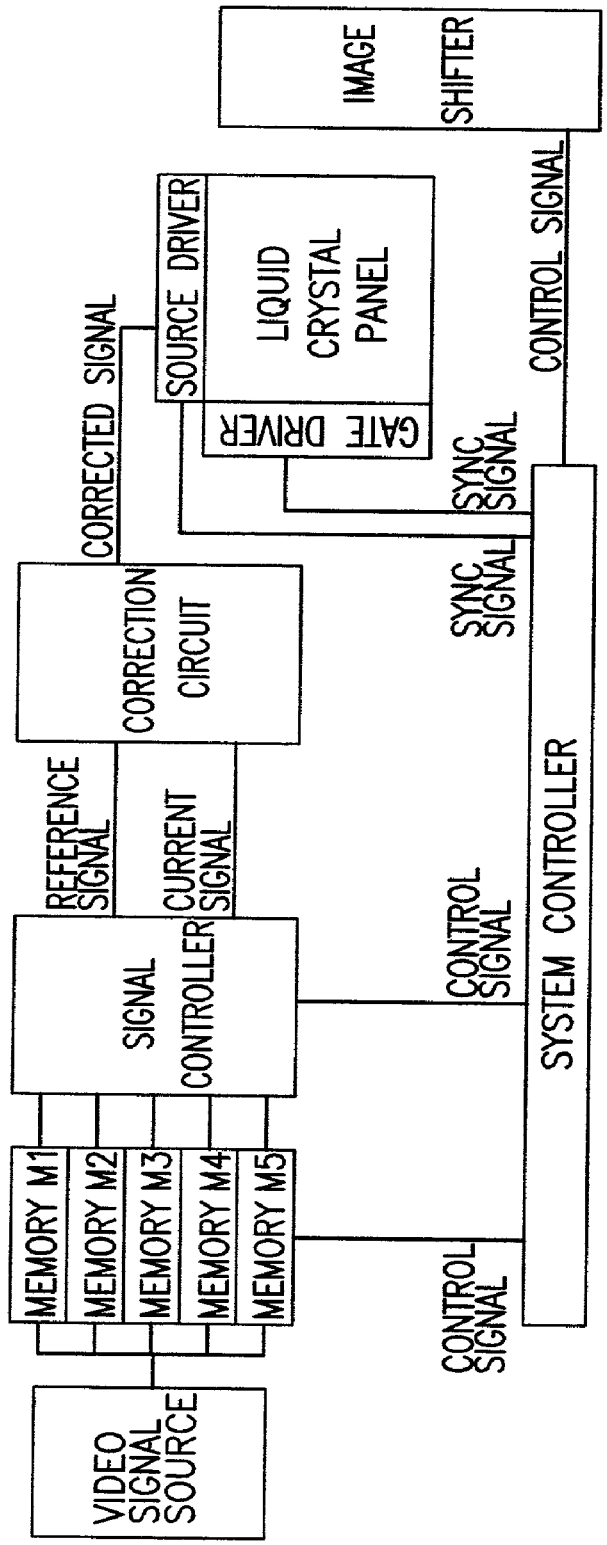
FIG. 20 illustrates a circuit configuration for a display device according to a third specific preferred embodiment of the present invention.

According to this third preferred embodiment, five memories M1 through M5 are used as shown in FIG. 20 and operated as shown in the following Tables 5 and 6:

TABLE 5

|  | 1st frame | | 2nd frame | |
| --- | --- | --- | --- | --- |
| Subframe No. | 1 | 2 | 1 | 2 |
| Memory from which reference signal is read | M5 | M1 | M2 | M3 |
| Memory from which current signal is read | M1 | M2 | M3 | M4 |
| Position | A | B | C | A |
| Memories on which next signals are written | M3, M4 | | M5, M1 | |

TABLE 6

|  | 3rd frame | | 4th frame | |
| --- | --- | --- | --- | --- |
| Subframe No. | 1 | 2 | 1 | 2 |
| Memory from which reference signal is read | M4 | M5 | M1 | M2 |
| Memory from which current signal is read | M5 | M1 | M2 | M3 |
| Position | B | C | A | B |
| Memories on which next signals are written | M2, M3 | | M4, M5 | |

In Tables 5 and 6, the positions of respective subframes on the projection plane are identified by A, B and C. Each subframe signal to be written on one of the memories M1 through M5 should represent the subframe having one of these positions A, B and C.

According to this method, not only the subframe frequency but also the number of memories (or memory areas) to be provided for the subframes can be reduced. The subframes may be actually changed at 120 Hz without causing the viewer any discomfort such as flickering. Also, compared to an image yet to be corrected, the resolution can be increased.

EMBODIMENT 4

Figure 21:
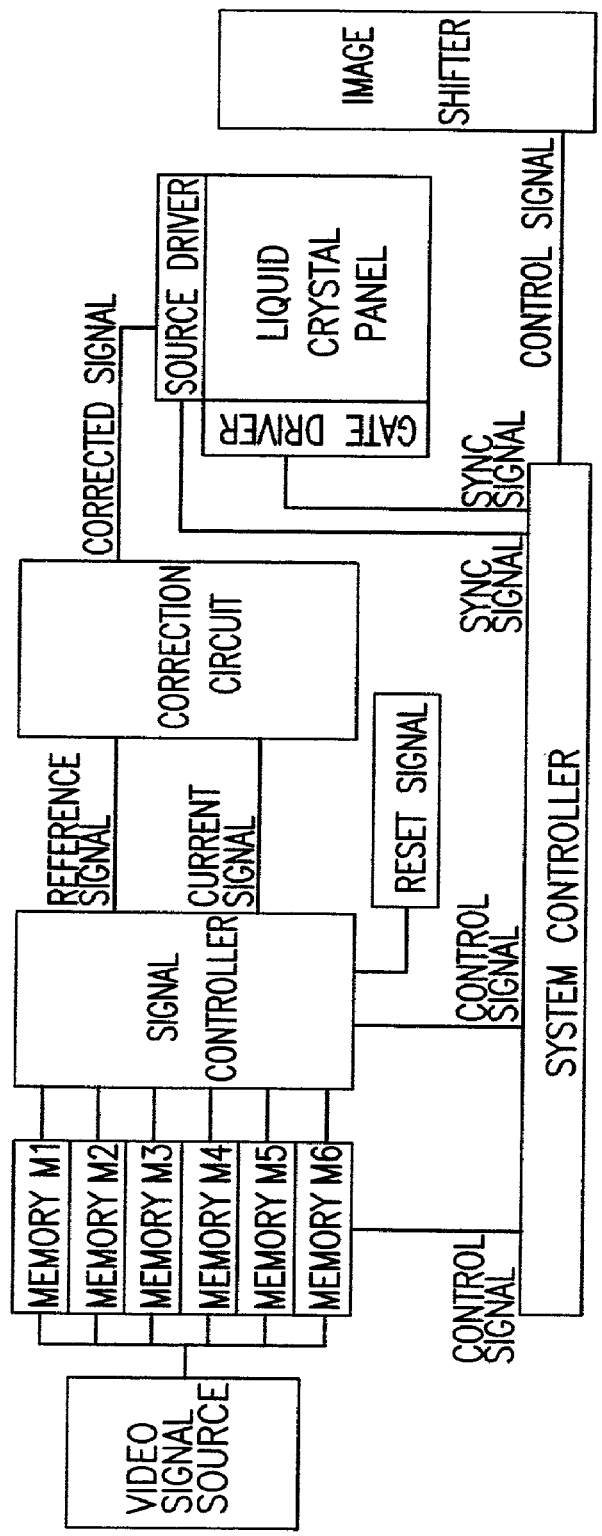
FIG. 21 illustrates a circuit configuration for a display device according to a fourth specific preferred embodiment of the present invention.

Hereinafter, a fourth specific preferred embodiment of the present invention will be described with reference to FIG. 21.

According to the second preferred embodiment of the present invention described above, a subframe signal representing a still picture can be corrected sufficiently accurately. In displaying a moving picture, however, a subframe signal representing that type of picture cannot always be corrected accurately enough. In contrast, according to this fourth preferred embodiment, even though six memories are provided for respective subframes, a subframe signal representing a moving picture can also be corrected accurately enough.

As in the second preferred embodiment, each frame is also divided into three subframes in this fourth preferred embodiment. However, in this preferred embodiment, four subframes are displayed one after another in one frame interval. More specifically, a reset subframe represented by a reset signal is inserted as the last subframe into each frame interval. A reset signal has such a level as getting all pixels displayed in black. In each frame interval, a subframe signal representing the first subframe is corrected by using the reset signal. The level of the reset signal is already known, and therefore, no subframe signal needs to be stored on any memory for the last subframe interval.

The following Table 7 shows which signals are input or output to/from which memories of the display device according to this preferred embodiment:

TABLE 7

|  | 1st frame | | | | 2nd frame | | | |
| --- | --- | --- | --- | --- | --- | --- | --- | --- |
| Subframe No. | 1 | 2 | 3 | 4 | 1 | 2 | 3 | 4 |
| Memory from which reference signal is read | RS | M1 | M2 | M3 | RS | M4 | M5 | M6 |
| Memory from which current signal is read | M1 | M2 | M3 | RS | M4 | M5 | M6 | RS |
| Memories on which next signals are written | M4, M5, M6 | | | | M1, M2, M3 | | | | where "RS" indicates that the reset signal is supplied.

To write the reset signal as intended on the display panel, the reset signal should also be corrected. While the reset signal is being written on the display panel, the illumination provided for the display panel may be turned OFF so as to allow the viewer to observe no images. In that case, the reset signal does not have to have the black display level.

Optionally, even when the reset signal has the black display level, the illumination may also be turned OFF. Then, the contrast ratio increases advantageously. The reason is as follows. Normally, the contrast ratio of a display panel is not infinite. Thus, even when color black is displayed, some quantity of light actually leaks, strictly speaking. Accordingly, by cutting off this leaking light, the contrast ratio can be increased substantially.

In the fourth preferred embodiment described above, the reset signal is written on the display panel just like a subframe signal representing any other subframe. However, if a reset signal of the same level is written for each of multiple pixels, the reset signal may be written on all of those pixels at a time. In that case, a longer time is allowed to write a subframe signal representing each subframe on the display panel. As a result, the subframe frequency can be reduced advantageously.

EMBODIMENT 5

Figure 22:
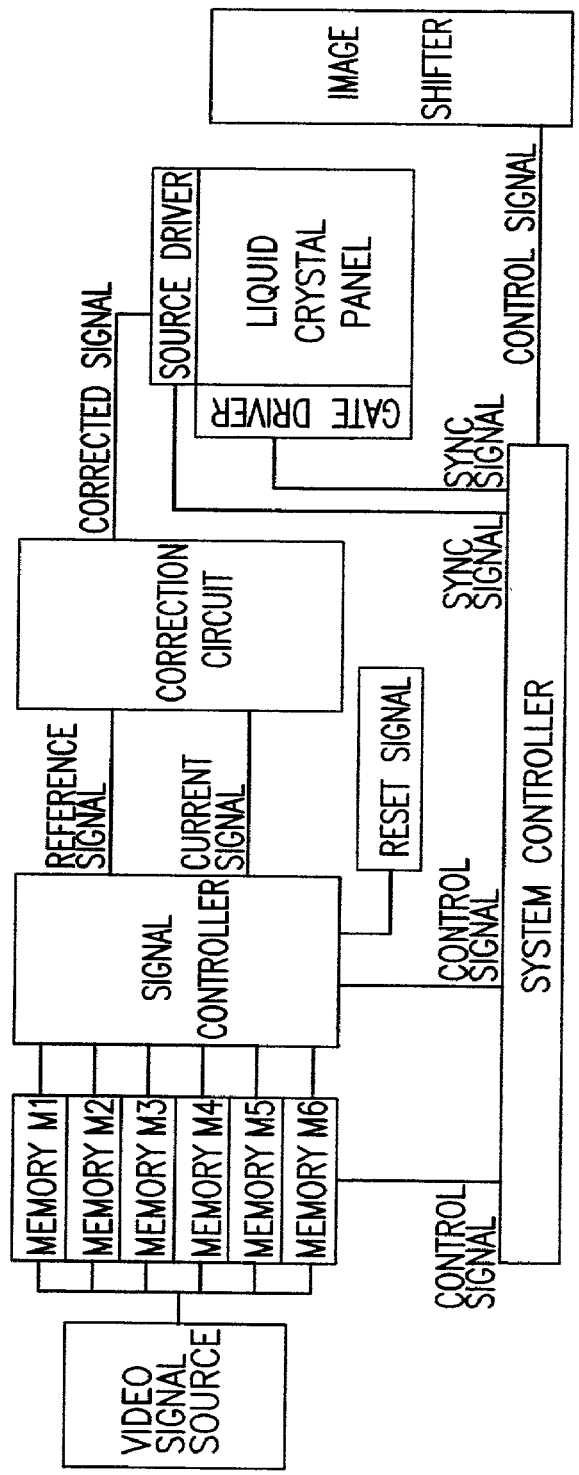
FIG. 22 illustrates a circuit configuration for a display device according to a fifth specific preferred embodiment of the present invention.

Hereinafter, a fifth specific preferred embodiment of the present invention will be described with reference to FIG. 22.

According to the fourth preferred embodiment described above, even though six memories are provided for respective subframes, a subframe signal representing a moving picture can also be corrected accurately enough.

As in the second and fourth preferred embodiments described above, each frame is also divided into three subframes in this fifth preferred embodiment. However, in this preferred embodiment, six subframes are displayed one after another in one frame interval. More specifically, each subframe is preceded by a reset subframe as represented by a reset signal. A reset signal has such a gray-scale level as getting all pixels displayed in black. An subframe signal representing each subframe is corrected by using the reset signal. The level of the reset signal is already known, and therefore, no subframe signal needs to be stored on any memory for each reset subframe interval.

The following Table 8 shows which signals are input or output to/from which memories of the display device according to this preferred embodiment:

TABLE 8

|  | 1st frame | | | 2nd frame | | |
| --- | --- | --- | --- | --- | --- | --- |
| Subframe No. | 1 | 2 | 3 | 1 | 2 | 3 |
| Memory from which reference signal is read | M3 | M1 | M2 | M6 | M4 | M5 |
| Memory from which current signal is read | RS M1 | RS M2 | RS M3 | RS M4 | RS M5 | RS M6 |
| Memories on which next signals are written | M4, M5, M6 | | | M1, M2, M3 | | | where "RS" indicates that the reset signal is supplied.

To write the reset signal as intended on the display panel, the reset signal should also be corrected. While the reset signal is being written on the display panel, the illumination provided for the display panel may be turned OFF so as to allow the viewer to observe no images. In that case, the reset signal does not have to have the black display level.

Optionally, even when the reset signal has the black display level, the illumination may also be turned OFF. Then, the contrast ratio increases advantageously. The reason is as follows. Normally, the contrast ratio of a display panel is not infinite. Thus, even when color black is displayed, some quantity of light actually leaks, strictly speaking. Accordingly, by cutting off this leaking light, the contrast ratio can be increased substantially.

In this fifth preferred embodiment, the image on the screen is reset on a subframe-by-subframe basis. Accordingly, compared to the fourth preferred embodiment, the image quality can be further improved. However, according to the fifth preferred embodiment, the image should be reset a greater number of times in each frame interval, and each subframe can be displayed for a shorter period of time. For that reason, this preferred embodiment is suitably applicable to a situation where a relatively small number of subframes are included in one frame interval (e.g., just two subframes should be displayed in one frame interval).

In the fifth preferred embodiment described above, the reset signal is written on the display panel just like a subframe signal representing any other subframe. However, if a reset signal of the same level is written for each of multiple pixels, the reset signal may be written on all of those pixels at a time. In that case, a longer time is allowed to write a subframe signal representing each subframe on the display panel. As a result, the subframe frequency can be reduced advantageously

EMBODIMENT 6

Hereinafter, a sixth specific preferred embodiment of the present invention will be described with reference to FIG. 23.

Figure 23:
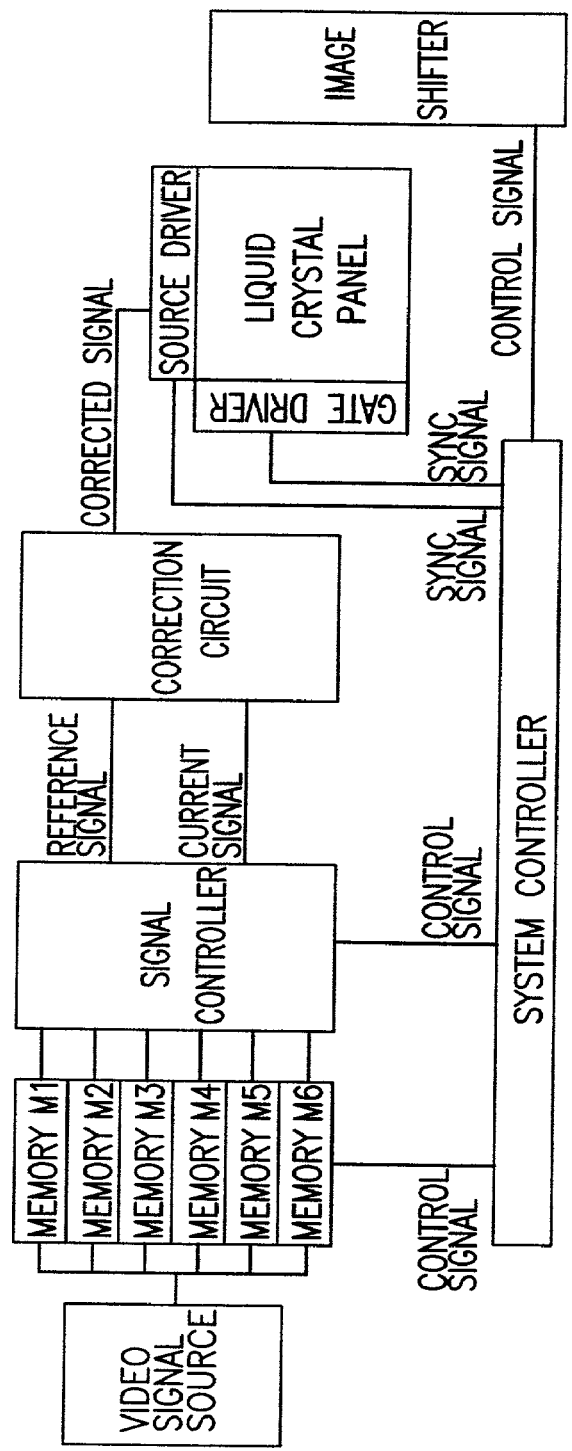
FIG. 23 illustrates a circuit configuration for a display device according to a sixth specific preferred embodiment of the present invention.

In this preferred embodiment, memories M1 through M6 are used as shown in FIG. 23 and operated as shown in the following Tables 9 and 10:

TABLE 9

|  | 1st frame | | 2nd frame | |
| --- | --- | --- | --- | --- |
| Subframe No. | 1 | 2 | 1 | 2 |
| Memory from which reference signal is read | M3 | M1 | M5 | M6 |
| Memory from which current signal is read | M1 | M2 | M6 | M4 |
| Position | A | B | C | A |
| Memories on which next signals are written | M4, M5, M6 | | M1, M2, M3 | |

TABLE 10

|  | 3rd frame | | 4th frame | |
| --- | --- | --- | --- | --- |
| Subframe No. | 1 | 2 | 1 | 2 |
| Memory from which reference signal is read | M1 | M2 | M6 | M4 |
| Memory from which current signal is read | M2 | M3 | M4 | M5 |
| Position | B | C | A | B |
| Memories on which next signals are written | M4, M5, M6 | | M1, M2, M3 | |

In this sixth preferred embodiment, a subframe signal representing the first subframe of each frame is corrected by reference to a subframe signal representing another subframe of the same frame as in the second preferred embodiment described above. However, unlike the second preferred embodiment, each frame is divided into two subframes in this sixth preferred embodiment.

An subframe is moved by an image shifter between three different positions on the same line on the projection plane, e.g., position A→position B→position C→position A→position B→position C, etc. That is to say, the subframe is wobbled so to speak.

As a subframe to be referred to for correction purposes, a subframe having a display position (shift position) equivalent to that of the last subframe of the previous frame is selected from the subframes of a current frame.

In the first through sixth preferred embodiments of the present invention described above, the light outgoing from the liquid crystal cell has its optical axis oscillated by the image shifter. However, the present invention is not limited to these specific preferred embodiments. Alternatively, the optical axis of the incoming light that is going to enter the liquid crystal cell may be oscillated by the image shifter, for example. In that case, light rays representing red, green and blue are sequentially incident onto the respective pixels of the display panel.

EMBODIMENT 7

Figure 24:
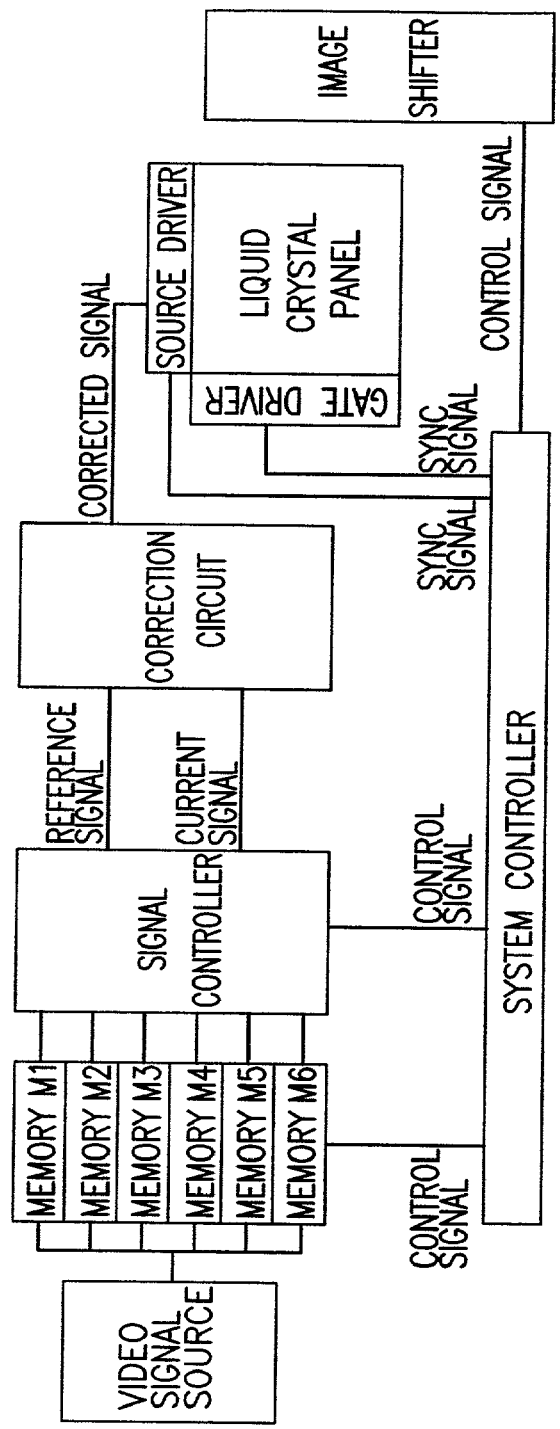
FIG. 24 illustrates a circuit configuration for a display device according to a seventh specific preferred embodiment of the present invention.

Hereinafter, a seventh specific preferred embodiment of the present invention will be described with reference to FIG. 24.

In the first through sixth preferred embodiments described above, even when a still or moving picture should be refreshed at a high frequency by using a slowly responding light modulating medium such as a liquid crystal material, the response of the light modulating medium can be increased for each and every subframe. As a result, an image of high quality can be obtained. However, where a liquid crystal material is used as the light modulating medium, the response of the material to a change from an intermediate gray-scale level to another is normally even lower than its response to a black-to-white or white-to-black level change. This point will be described with reference to the following Table 11, which shows how fast a liquid crystal material can respond when a gray-scale level (of the previous frame) is changed into another target gray-scale level (of the current frame):

TABLE 11

| | | CURRENT FRAME | | | | | | | |
|---|---|---|---|---|---|---|---|---|---|
| | | 0 | 32 | 64 | 96 | 128 | 160 | 192 | 244 | 255 |
| P R E V I O U S | 0 | | 4.3 | 8.1 | 10.7 | 12.1 | 12.7 | 10.2 | 9.8 | 8.3 |
| | 32 | 8.7 | | 6.9 | 8.5 | 11.1 | 11.1 | 10.4 | 9.7 | 7.8 |
| | 64 | 1.9 | 2.7 | | 8.5 | 10.1 | 10.7 | 10.4 | 9.3 | 7.8 |
| | 96 | 1.5 | 2.2 | 4.0 | | 5.3 | 8.0 | 8.5 | 9.3 | 7.5 |
| | 128 | 1.4 | 2.2 | 3.6 | 8.8 | | 5.9 | 7.4 | 8.6 | 7.9 |
| | 160 | 1.4 | 2.1 | 3.5 | 6.0 | 8.7 | | 6.5 | 9.6 | 7.9 |
| | 192 | 1.5 | 2.3 | 3.6 | 6.2 | 8.2 | 8.9 | | 11.7 | 9.8 |
| | 224 | 1.6 | 2.6 | 4.2 | 6.8 | 8.9 | 10.2 | 12.1 | | 11.1 |
| | 255 | 2.0 | 3.3 | 5.3 | 8.4 | 10.3 | 11.9 | 14.4 | 15.0 | |

In Table 11, the numerals attached to the "previous (frame)" and "current frame" indicate the gray-scale levels, while the other numerals indicate response speeds or response times (ms) of the liquid crystal material. For example, where the previous frame has a gray-scale level of 255 and the current frame has a gray-scale level of 192, the time it takes for the liquid crystal material to respond to this gray-scale level change (i.e., the response time) is 14.4 ms according to Table 11.

As can be seen from Table 11, the response of the liquid crystal material to one gray-scale level change is different from its response to another. The response speed is particularly low with respect to a certain gray-scale level change. Thus, according to this seventh preferred embodiment, further correction is made for that gray-scale level change causing the particularly low response speed.

As in the second and fifth preferred embodiments described above, each frame is also divided into three subframes according to this seventh preferred embodiment. However, in this preferred embodiment, a bypass subframe and an subframe are displayed in this order in each subframe interval. More specifically, a bypass subframe is inserted into the beginning of each subframe interval. The bypass subframe is produced and output by the signal controller shown in FIG. 24 by reference to the subframes stored on the memories M1 through M6.

The following Table 12 shows which subframe signals are input or output to/from which memories of the display device according to this preferred embodiment:

TABLE 12

| | 1st frame | | | 2nd frame | | |
|---|---|---|---|---|---|---|
| Subframe No. | 1 | 2 | 3 | 1 | 2 | 3 |
| Memory from which reference signal is read | M6 | M7 | M1 | M2 | M3 | M4 |
| Memory from which current signal is read | BP M7 | BP M1 | BP M2 | BP M3 | BP M4 | BP M5 |
| Memories on which next signals are written | M4, M5, M6 | | | M1, M2, M3 | | | where "BP" denotes a bypass subframe.

Next, it will be described how to make the bypass subframe. For example, suppose the display state at a pixel changes from a gray-scale level of 255 into a gray-scale level of 192. In the example shown in Table 11, it takes 14.4 ms for the liquid crystal material to respond to the change in gray-scale level from 255 to 192. However, according to this preferred embodiment, the display state is not directly changed from the gray-scale level of 255 to the gray-scale level of 192. Instead, the gray-scale level of 0 is once presented and then the gray-scale level of 192 is presented as shown in the following Table 13:

TABLE 13

| | | CURRENT FRAME | | | | | | | |
|---|---|---|---|---|---|---|---|---|---|
| | | 0 | 32 | 64 | 96 | 128 | 160 | 192 | 244 | 255 |
| P R E V I O U S | 0 | | 4.3 | 8.1 | 10.7 | 12.1 | 12.7 | 10.2 | 9.8 | 8.3 |
| | 32 | 8.7 | | 6.9 | 8.5 | 11.1 | 11.1 | 10.4 | 9.7 | 7.8 |
| | 64 | 1.9 | 2.7 | | 8.5 | 10.1 | 10.7 | 10.4 | 9.3 | 7.8 |
| | 96 | 1.5 | 2.2 | 4.0 | | 5.3 | 8.0 | 8.5 | 9.3 | 7.5 |
| | 128 | 1.4 | 2.2 | 3.6 | 8.8 | | 5.9 | 7.4 | 8.6 | 7.9 |
| | 160 | 1.4 | 2.1 | 3.5 | 6.0 | 8.7 | | 6.5 | 9.6 | 7.9 |
| | 192 | 1.5 | 2.3 | 3.6 | 6.2 | 8.2 | 8.9 | | 11.7 | 9.8 |
| | 224 | 1.6 | 2.6 | 4.2 | 6.8 | 8.9 | 10.2 | 12.1 | | 11.1 |
| | 255 | 2.0 | 3.3 | 5.3 | 8.4 | 10.3 | 11.9 | 14.4 | 15.0 | |

As shown in Table 13, the response speed of the liquid crystal is 2.0 ms with respect to a change in gray-scale level from 255 to 0 and 10.2 ms with respect to a change in gray-scale level from 0 to 192, respectively. Accordingly, the total response time is 12.2 ms if the gray-scale level is changed in two steps by way of the bypass level of 0. This response time is shorter then the time it takes for the liquid crystal material to respond to the direct gray scale level change from 255 to 192 (i.e., 14.4 ms).

In this manner, with respect to a certain gray-scale level change, the liquid crystal may respond rather faster if a third gray-scale is once presented before the target gray-scale level. When the inter-gray-scale response speeds of a liquid crystal such as those shown in Table 11 are known in advance, it is possible to determine whether the third gray-scale level should be once presented or not. Accordingly, by measuring the response speeds of the liquid crystal material to respective gray-scale level changes, it is possible to know beforehand how the gray-scale levels should be changed.

In this preferred embodiment, it is determined in advance by the inter-gray-scale response speeds of the liquid crystal which transition path should be followed for each particular gray-scale level change, thereby setting the gray-scale levels of the bypass subframes. As for a pixel for which the gray-scale level should rather be changed directly into the target level to make the liquid crystal material respond faster, the same gray-scale level may be presented for both the bypass subframe and the subframe. In that case, the state of the liquid crystal material can be changed by making full use of each subframe interval.

The length of time for which each bypass subframe is displayed should preferably be changed depending on how long it takes for the liquid crystal material to respond to the change into its associated temporary gray-scale level. More specifically, each bypass subframe may be displayed for a period of time equal to the average or maximum value of the response speeds with respect to the changes into respective temporary gray-scale levels. Alternatively, the bypass subframes may be monitored so that each of those bypass subframes may be displayed for a variable length of time that changes dynamically depending on the contents thereof.

It should be noted that if a subframe signal representing each bypass subframe is corrected as in the first through fourth preferred embodiments described above by reference to a subframe signal representing the previous subframe, then the response speed can be further increased. More preferably, a subframe signal representing each subframe should be corrected by reference to a subframe signal representing its associated bypass subframe.

In this manner, according to this preferred embodiment, the gray-scale level of a bypass subframe, which should be temporarily displayed during each gray-scale level change, is determined beforehand. That is to say, the correction value is also known in advance and there is no need to provide any additional memory besides the memories for storing the subframes thereon.

A bypass subframe being displayed should also be corrected. While a bypass subframe is being written on the display panel, the illumination provided for the display panel may be turned OFF to allow the viewer to observe no images.

EMBODIMENT 8

Hereinafter, an eighth specific preferred embodiment of the present invention will be described with reference to FIG. 25.

In the first through seventh preferred embodiments of the present invention described above, while subframes are sequentially displayed one after another by the display panel, the subframes are shifted on the projection plane by the image shifter, thereby producing one frame representing an image. In contrast, this eighth preferred embodiment of the present invention relates to an display device that utilizes the field sequential color display technique. That is to say, in this preferred embodiment, each image frame is divided into three subframes representing the three primary colors of red, green and blue and the colors of the light source are sequentially changed among red, green and blue synchronously with the beginning of subframe intervals.

In this eighth preferred embodiment, subframe signals may be input or output to/from the subframe memories and corrected as in the first through fifth preferred embodiments of the present invention described above. The main difference between the first and eighth embodiments illustrated in FIGS. 11 and 25, respectively, lies in that the eighth embodiment does not use the image shifter but changes the colors of the light source among red, green and blue. Also, the first, second and third subframes for use in this eighth preferred embodiment are shown on the left-hand side of FIG. 6 and are stored on at least three frame memories.

In such a field sequential color display technique, normally the colors are also mixed easily in each subframe and the color reproducibility also likely decreases due to the delay in response of the liquid crystal material. However, according to this preferred embodiment, a subframe signal representing each subframe is correctible appropriately. As a result, the color mixture is suppressible and the color reproducibility is improvable significantly.

Figure 25:
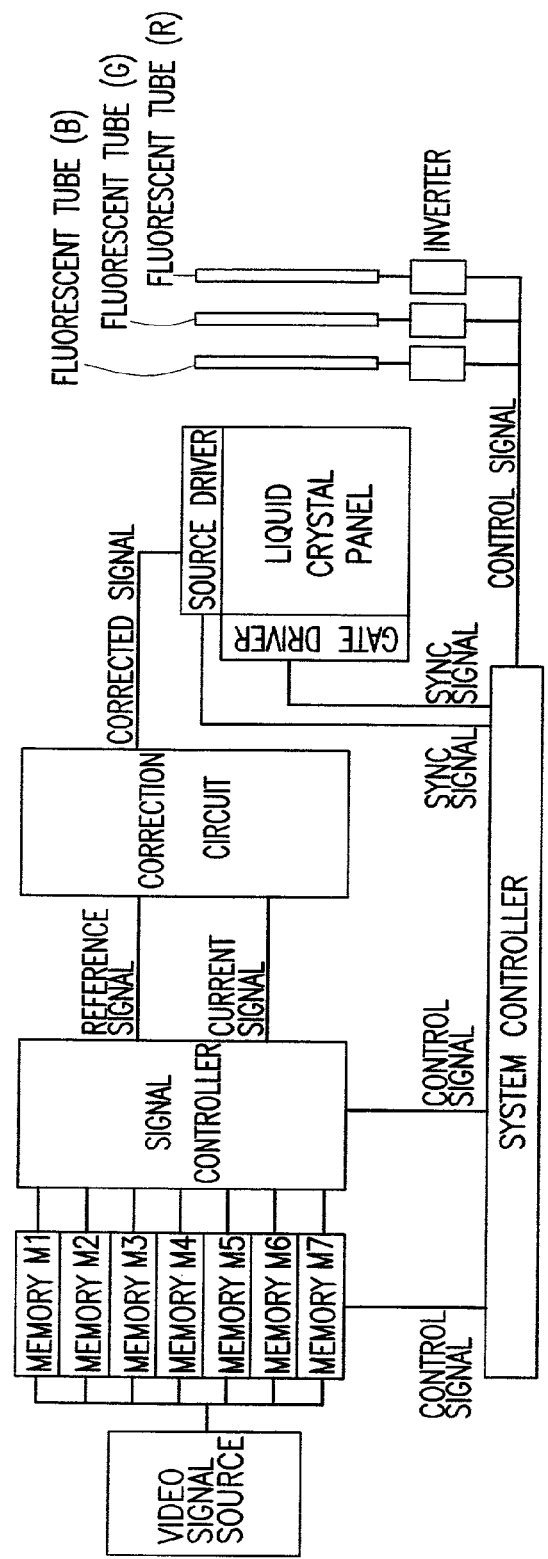
FIG. 25 illustrates a circuit configuration for a display device according to an eighth specific preferred embodiment of the present invention.

It should be noted that the display device of this eighth preferred embodiment does not have to have the configuration shown in FIG. 25 but may have a configuration according to any of the preferred embodiments described above.

The present invention provides an display device of the type dividing each frame into a plurality of subframes and sequentially outputting those subframes one after another to form one frame. The display device of the present invention can appropriately correct a subframe signal representing the first subframe of each frame. Thus, even if subframes should be refreshed at a high frequency by using a slowly responding light modulating medium (e.g., a liquid crystal material), the response speed of the medium can be increased for each and every subframe. As a result, an image of high quality can be obtained.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention

What is claimed is:

1. A display device for dividing each frame into a number of subframes and displaying one of the subframes after another, said device comprising:

correction means for correcting a subframe signal representing one subframe by reference to another subframe signal representing another subframe, and a display panel for displaying each said subframe in accordance with the subframe signal that has been corrected by the correction means, wherein said correction means corrects a subframe signal, representing the first one of the subframes that make up a current frame, by reference to a subframe signal representing another one of the subframes of the current frame, the another subframe being equivalent to the last subframe of the previous frame, and wherein said correction means corrects a subframe signal, representing a non-first one of the subframes of the current frame, by reference to a subframe signal representing the previous one of the subframes of the current frame that has been displayed just before the non-first subframe.

2. A display device for dividing each frame into a number of subframes and displaying one of the subframes after another, said device comprising:

correction means for correcting a subframe signal representing one subframe by reference to another subframe signal representing another subframe, and a display panel for displaying each said subframe in accordance with the subframe signal that has been corrected by the correction means, wherein said correction means corrects a subframe signal, representing the first one of the subframes that make up a current frame, by reference to a signal intensity level of a subframe signal representing the last one of the subframes that make up the previous frame, and wherein said correction means corrects a subframe signal, representing a non-first one of the subframes of the current frame, by reference to a signal intensity level of a subframe signal representing the previous one of the subframes of the current frame that has been displayed just before the non-first subframe.

3. The device of claim 1, wherein before the first one of the subframes that make up each said frame is displayed or after the last one of the subframes of the frame has been displayed, a displayed subframe is refreshed in response to a signal having a preset level.

4. The device of claim 1, wherein before each of the subframes that make up each said frame is displayed, a displayed subframe is refreshed in response to a signal having a preset level.

5. The device of claim 1, wherein before a first one of the subframes that make up each said frame is displayed, a bypass subframe is displayed, the bypass subframe being prepared for second and third ones of the subframes, the second subframe having been displayed just before the first subframe, the third subframe being to be displayed next to the first subframe.

6. The device of claim 2, wherein before the first one of the subframes that make up each said frame is displayed or after the last one of the subframes of the frame has been displayed, a displayed subframe is refreshed in response to a signal having a preset level.

7. The device of claim 2, wherein before each of the subframes that make up each said frame is displayed, a displayed subframe is refreshed in response to a signal having a preset level.

8. The device of claim 2, wherein before a first one of the subframes that make up each said frame is displayed, a bypass subframe is displayed, the bypass subframe being prepared for second and third ones of the subframes, the second subframe having been displayed just before the first subframe, the third subframe being to be displayed next to the first subframe.

9. The device of claim 8, wherein the bypass subframe is displayed for a constant length of time.

10. The device of claim 8, wherein the bypass subframe is displayed for a variable length of time, which changes with the subframes that are displayed before and after the bypass subframe.

11. The device of one of claims 1, 2, 3, 4, 5, or 6–8 further comprising an image shifter for shifting the subframes, wherein each pixel area on a projection plane is sequentially irradiated with multiple light rays, that have been modulated at mutually different pixel regions and that belong to respectively different wavelength ranges.

12. The device of one of claims 1, 2, 3, 4, 5 or 6–8, wherein the device divides each said frame into a number of subframes so that the subframes correspond to three mutually different wavelength ranges and displays the subframes on a projection plane by a time sequential method, thereby forming a color image on the projection plane.

13. The device of one of claims 1, 2, 3, 4, 5 or 6–8, wherein the device sequentially scans the display panel with multiple light rays belonging to mutually different wavelength ranges, thereby superimposing the subframes one upon another on a projection plane and irradiating each pixel area on the projection plane with the light rays that belong to the mutually different wavelength ranges and that have been modulated at the same pixel region of the display panel.

14. The device of one of claims 1, 2, 3, 4, 5 or 6–8, further comprising storage means for storing subframe signals representing a plurality of frames thereon, wherein each said subframe signal is written on, or read out from, the storage means on a frame-by-frame basis.

15. The device of one of claims 1, 2, 3, 4, 5 or 6–8, further comprising storage means for storing subframe signals representing a plurality of subframes thereon, wherein the storage means comprises a plurality of memory areas that have been partitioned for the respective subframes.

16. The device of one of claims 1, 2, 3, 4, 5 or 6–8, wherein at least one additional voltage level, which is higher than the highest one of multiple voltage levels prepared to output a subframe signal yet to be corrected, is provided and used as a voltage level at which the corrected subframe signal is output.

17. The device of one of claims 1, 2, 3, 4, 5 or 6–8, wherein at least one additional voltage level, which is lower than the lowest one of multiple voltage levels prepared to output a subframe signal yet to be corrected, is provided and used as a voltage level at which the corrected subframe signal is output.

18. The device of one of claims 1, 2, 3, 4, 5 or 6–8, wherein the correction means consults a lookup table for subframe signals representing the previous and current subframes, respectively, to correct the subframe signal representing the current subframe in accordance with the lookup table.

19. The device of claim 18, further comprising:

a nonvolatile memory on which data required for correcting the subframe signals has been stored;

means for reading out the data from the nonvolatile memory; and a second memory on which the data that has been read out from the nonvolatile memory is storable, wherein when the device starts to be driven, the data is transferred from the nonvolatile memory to the second memory to make the lookup table.

20. The device of one of claims 1, 2, 3, 4, 5 or 6–8, wherein the correction means corrects the subframe signal representing the current subframe to be displayed by performing an arithmetic operation on the subframe signal representing the subframe to be referred to and the subframe signal representing the current subframe to be displayed.

21. The device of claim 20, wherein the arithmetic operation is given by $$SA'_n = SA_n + (SA_n SA_{n-1})/M$$

where $SA'_n$ is the corrected subframe signal, $SA_n$ is the subframe signal representing the current subframe, $SA_{n-1}$ is the subframe signal representing the subframe to be referred to and M is a positive number.

22. The device of claim 21, wherein M is $2^n$ (where n is an arbitrary integer).

23. The device of claim 21, wherein the magnitude of M is changed in accordance with the magnitude of $(SA_n - SA_{n-1})$.

24. The device of one of claims 1, 2, 3, 4, 5 or 6–8, wherein the subframe signal is a signal of q bits (where q is an integer equal to or greater than 2), and wherein high-order p bits of the q-bit signal (where p is an integer equal to or greater than 1 and q>p) are corrected.

25. The device of one of claims 1, 2, 3, 4, 5 or 6–8, wherein each said frame is divided into a number m of subframes, where m is an integer equal to or greater than 3, and wherein n out of the m subframes (where n is an integer equal to or greater than 2 and n<m) are sequentially displayed within one frame interval.

26. The device of claim 25, wherein m is 3 and n is 2.

27. The device of claim 5, wherein the bypass subframe is displayed for a constant length of time.

28. The device of claim 5, wherein the bypass subframe is displayed for a variable length of time, which changes with the subframes that are displayed before and after the bypass subframe.

29. The device of claim 5, 27, 28, 8, 9 or 10, wherein a subframe signal representing the bypass subframe is corrected by using the subframe signal representing the subframe that has been displayed just before the bypass subframe.

30. The device of claim 5, 27, 28, 8, 9 or 10, wherein the subframe signal, representing the subframe to be displayed just after the bypass subframe, is corrected by using the subframe signal representing the bypass subframe.

31. The device of claim 3, 4, 6 or 7, wherein the device conducts a display operation in accordance with a driving method for use to display the subframes and in response to the signal having the preset level.

32. The device of claim 31, wherein the signal having the preset level is corrected by using the subframe signal representing the subframe that has been displayed just before the current subframe.

33. The device of claim 31, wherein a subframe signal, representing the subframe that is displayed just after the displayed subframe has been refreshed, is corrected by using a refresh signal.

34. The device of claim 3, 4, 6 or 7, wherein the displayed subframe is refreshed by supplying the signal having the preset level to all scan lines that make up the image.

35. The device of claim 34, wherein a black image is formed by conducting the display operation in response to the signal having the preset level.

36. The device of claim 3, 4, 6 or 7, wherein while the device is conducting a display operation in response to the signal having the preset level, no display pixels are illuminated by a light source.

37. The device of claim 34, wherein a subframe signal, representing the subframe that is displayed just after the displayed subframe has been refreshed, is corrected by using a refresh signal.

38. The device of claim 2, further comprising a memory for storing the subframe signal representing the last subframe of the previous frame at least until the first subframe of the current frame has been displayed.

39. The device of claim 2, further comprising a memory for storing the subframe signal representing the last subframe of the previous frame at least until the first subframe of the current frame has been stored.

40. The device of claim 1, wherein each of the subframes contains information about all three primary colors (red R, green G, and blue B).

41. The device of claim 2, wherein each of the subframes contains information about all three primary colors (red R, green G, and blue B).

* * * * *